(12) United States Patent
Endo

(10) Patent No.: US 8,786,676 B2
(45) Date of Patent: Jul. 22, 2014

(54) IMAGING DEVICE FOR GENERATING STEREOSCOPIC IMAGE

(75) Inventor: Hiroshi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 311 days.

(21) Appl. No.: 13/069,064

(22) Filed: Mar. 22, 2011

(65) Prior Publication Data
US 2011/0234861 A1 Sep. 29, 2011

(30) Foreign Application Priority Data

Mar. 23, 2010 (JP) ................................ 2010-066522
Mar. 17, 2011 (JP) ................................ 2011-059202

(51) Int. Cl.
H04N 13/02 (2006.01)
H04N 13/00 (2006.01)
H04N 5/228 (2006.01)
G03B 13/00 (2006.01)
H04N 5/232 (2006.01)

(52) U.S. Cl.
USPC .............. 348/46; 348/42; 348/43; 348/222.1; 348/345

(58) Field of Classification Search
CPC .......... H04N 5/23212; H04N 13/0003; H04N 13/0239; H04N 13/0431; H01L 27/14621; H01L 27/14627; H01L 27/14623; H01L 27/14625; H01L 27/14636; H01L 27/14685; H01L 27/14687; H01L 27/14868; G03B 35/00; G06T 2207/10021; G02B 27/2207; G02B 2027/0134; G02B 27/22; G02B 27/2228; G09G 2320/0233
USPC .......... 348/222.1, 240.99, 240.1–3, 345–357, 348/234–238, 252, 254, 255, 42–60
See application file for complete search history.

(56) References Cited

U.S. PATENT DOCUMENTS

| 5,202,555 | A | * | 4/1993 | Ishida et al. ................ 250/201.8 |
| 5,786,847 | A | * | 7/1998 | Katayama et al. ............... 348/47 |
| 5,926,318 | A | * | 7/1999 | Hebert ............................ 359/618 |
| 5,995,144 | A | * | 11/1999 | Sasakura ........................ 348/350 |
| 6,396,946 | B1 | * | 5/2002 | Sogawa ......................... 382/154 |
| 6,937,777 | B2 | * | 8/2005 | Shirakawa ..................... 382/274 |

(Continued)

FOREIGN PATENT DOCUMENTS

| JP | 2002218298 A | 8/2002 |
| JP | 2003241075 A | 8/2003 |

(Continued)

OTHER PUBLICATIONS

Notice of Reasons for Rejection, dated Mar. 5, 2014, issued in corresponding JP Application No. 2011-059202, 6 pages in English and Japanese.

Primary Examiner — Chia-Wei A Chen
(74) Attorney, Agent, or Firm — Sughrue Mion, PLLC

(57) ABSTRACT

An imaging device comprising a single photographing optical system, an image sensor having a plurality of pixels for obtaining a plurality of viewpoint images by photo-electrically converting a luminous flux passing through different regions of the photographing optical system, and a shading correction part for conducting a shading correction to the plurality of viewpoint images. The shading correction part varies the amount of shading correction based on light-reduction property for one viewpoint image among the plurality of viewpoint images with respect to the amount of shading correction based on light-reduction property for the other viewpoint image among the plurality of viewpoint images.

13 Claims, 18 Drawing Sheets

(56) References Cited

U.S. PATENT DOCUMENTS

| | | | |
|---|---|---|---|
| 7,102,675 B1* | 9/2006 | Tokunaga | 348/297 |
| 7,358,999 B2* | 4/2008 | Ikeda | 348/349 |
| 7,474,352 B2* | 1/2009 | Oikawa | 348/349 |
| 7,599,531 B2* | 10/2009 | Hauke et al. | 382/124 |
| 8,279,318 B2* | 10/2012 | Suzuki et al. | 348/333.01 |
| 8,300,088 B2* | 10/2012 | Lee et al. | 348/46 |
| 2001/0033701 A1* | 10/2001 | Okisu et al. | 382/284 |
| 2002/0094131 A1* | 7/2002 | Shirakawa | 382/274 |
| 2004/0179128 A1* | 9/2004 | Oikawa | 348/345 |
| 2005/0218297 A1* | 10/2005 | Suda et al. | 250/208.1 |
| 2006/0202932 A1* | 9/2006 | Oda | 345/90 |
| 2007/0102619 A1* | 5/2007 | Kusaka | 250/201.2 |
| 2007/0211243 A1* | 9/2007 | Laroche et al. | 356/243.1 |
| 2008/0121785 A1* | 5/2008 | Kochi | 250/208.1 |
| 2010/0007718 A1 | 1/2010 | Rohaly, Jr. et al. | |
| 2010/0020199 A1* | 1/2010 | Meitav et al. | 348/231.99 |
| 2010/0060721 A1* | 3/2010 | Chen et al. | 348/51 |
| 2010/0128152 A1* | 5/2010 | Hayasaka et al. | 348/280 |
| 2010/0177205 A1* | 7/2010 | Shimoda et al. | 348/222.1 |
| 2011/0018967 A1* | 1/2011 | Mirbach et al. | 348/46 |
| 2011/0019028 A1* | 1/2011 | Kimijima et al. | 348/222.1 |
| 2011/0074991 A1* | 3/2011 | Sakoh | 348/279 |
| 2011/0080487 A1* | 4/2011 | Venkataraman et al. | 348/218.1 |
| 2011/0090371 A1* | 4/2011 | Cote et al. | 348/237 |
| 2011/0109775 A1* | 5/2011 | Amano | 348/241 |
| 2011/0115964 A1* | 5/2011 | Gere | 348/342 |
| 2011/0122308 A1* | 5/2011 | Duparre | 348/340 |
| 2013/0016275 A1* | 1/2013 | Hokoi | 348/345 |

FOREIGN PATENT DOCUMENTS

| | | |
|---|---|---|
| JP | 2004-191629 A | 7/2004 |
| JP | 2009-168995 A | 7/2009 |
| JP | 2009-527007 A | 7/2009 |
| JP | 2009-244858 A | 10/2009 |

* cited by examiner

NORMAL PIXEL

PHASE-DIFFERENCE PIXEL

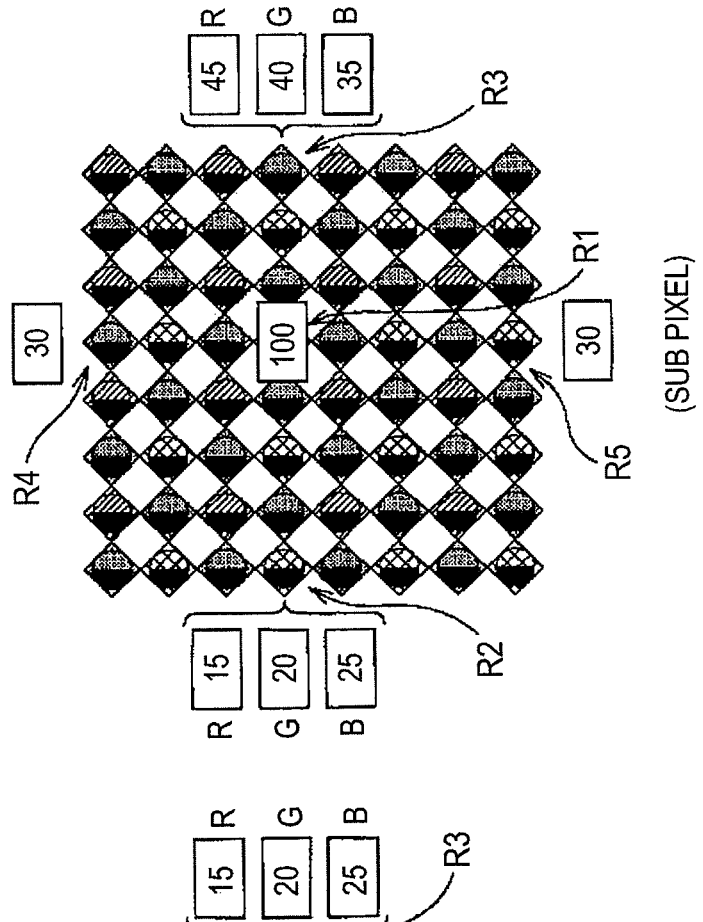
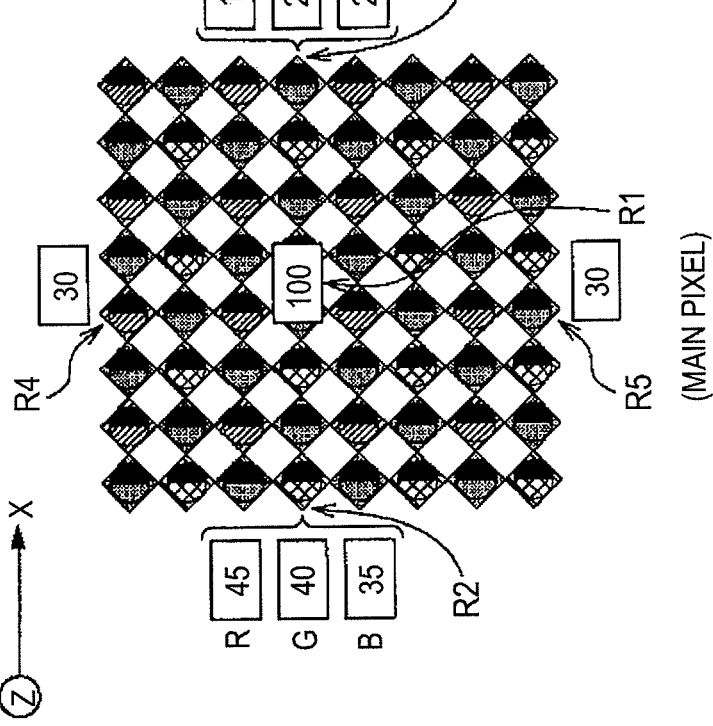

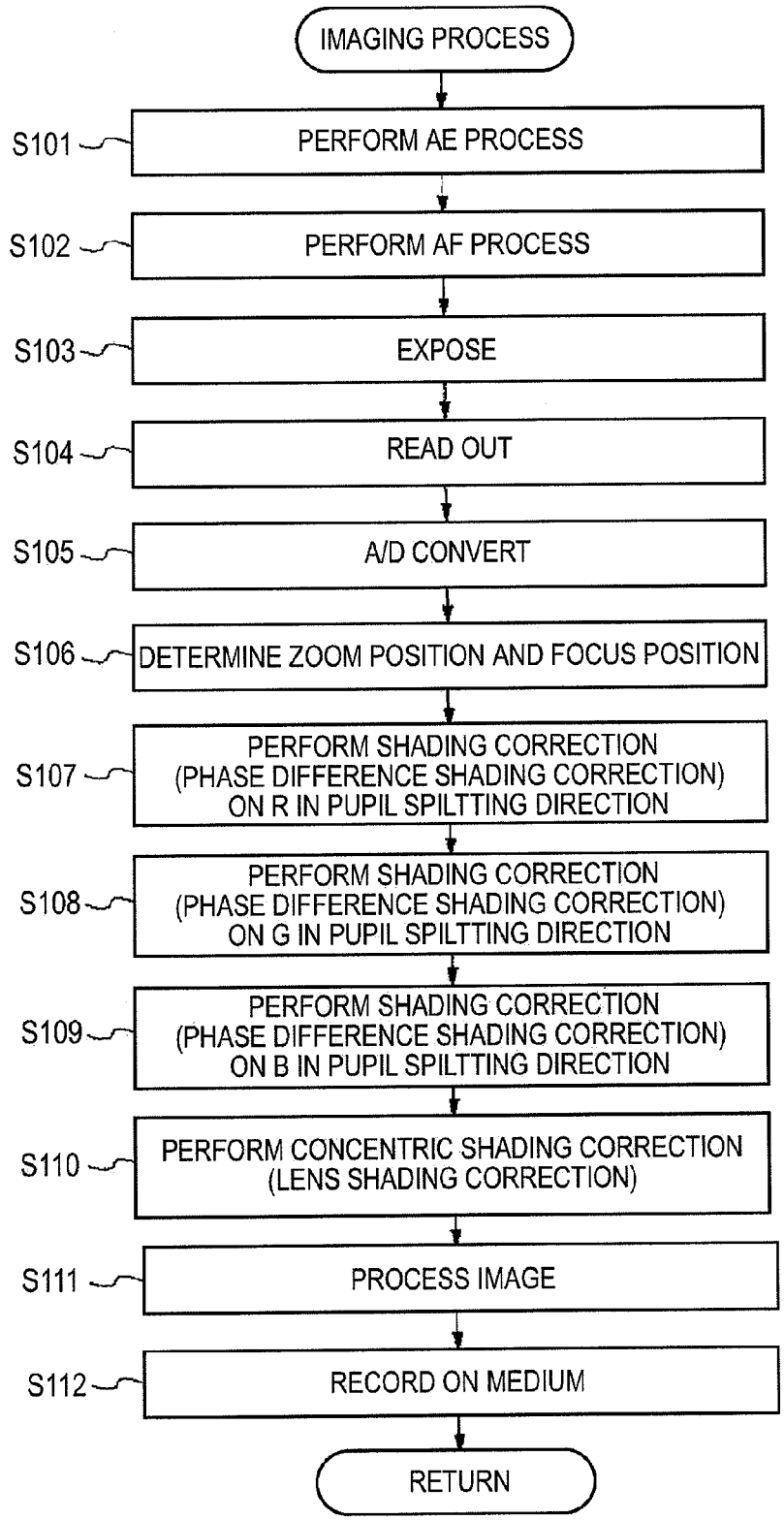

LIGHT-REDUCTION PROPERTY BY PHASE DIFFERENCE

LIGHT-REDUCTION PROPERTY BY LENS

LIGHT-REDUCTION PROPERTY BY PHASE DIFFERENCE AND LENS

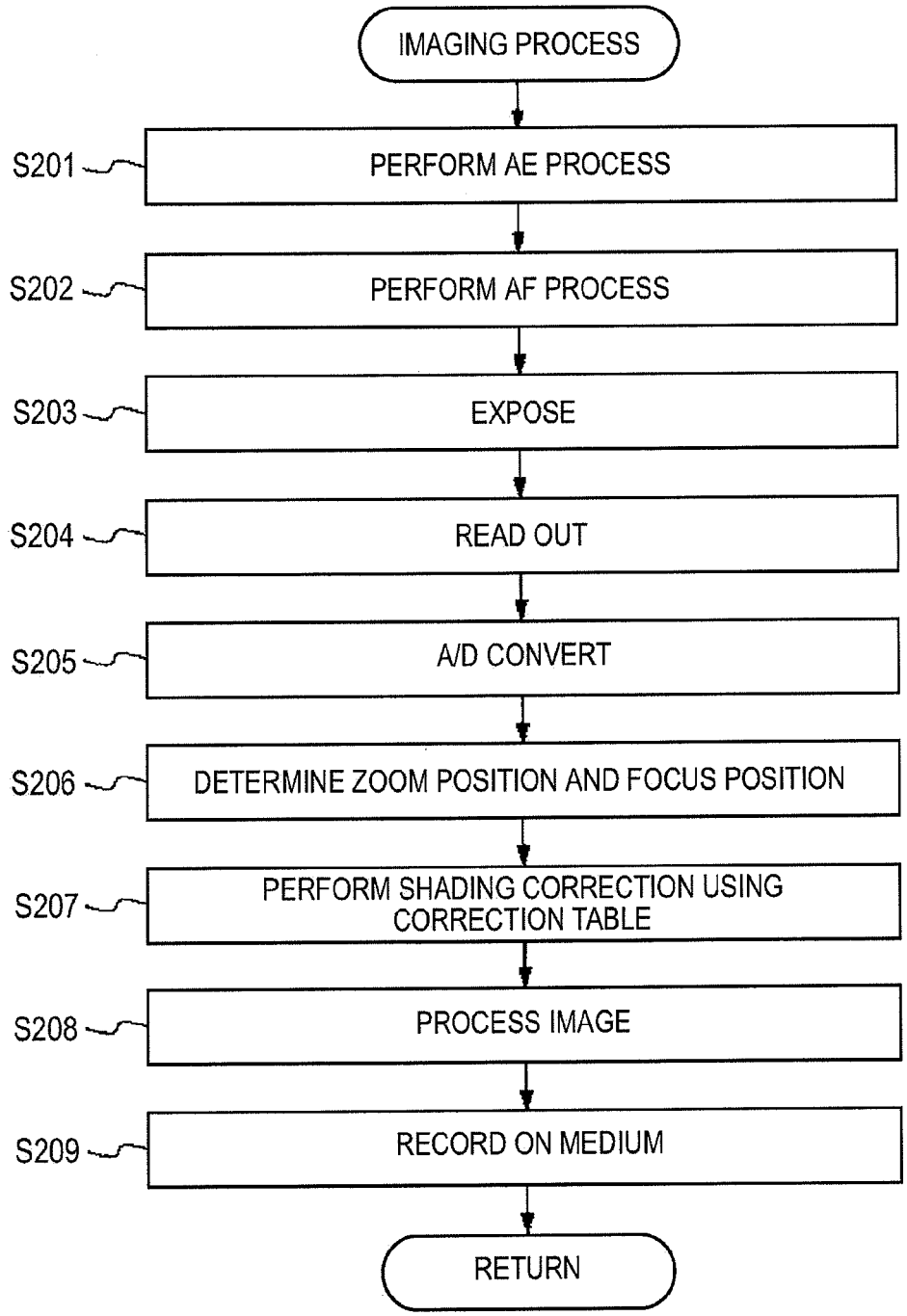

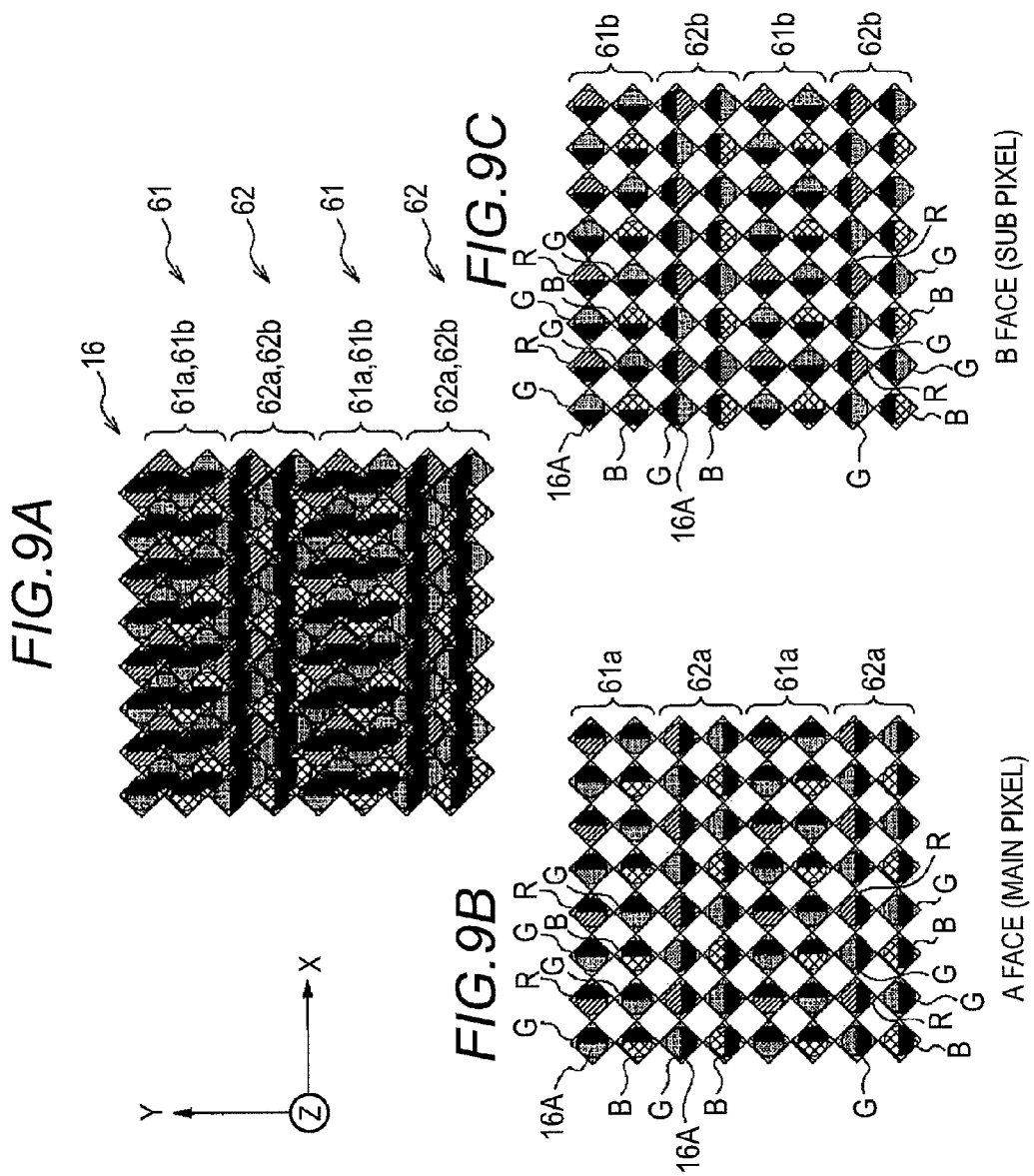

IMAGING DEVICE FOR GENERATING STEREOSCOPIC IMAGE

BACKGROUND OF THE INVENTION

1. Field of the Invention

The present invention relates to a technique of obtaining plural viewpoint images by photo-electrically converting a luminous flux passing through different regions of a single photographing optical system.

2. Description of the Related Art

Conventionally, an imaging device having an optical system as shown in FIG. 16 has been known (JP2009-527007A).

In FIG. 16, a luminous flux passing through different regions in a left-right direction (vertical or crosswise direction in the drawing) of a main lens 1 and a relay lens 2 is split by a mirror 4, and the split luminous fluxes are photo-electrically converted by image sensors 7 and 8 via focus lenses 5 and 6.

FIGS. 17A to 17C are diagrams illustrating a difference in an object image focused on an image sensor due to a difference in an object distance (distant and close). Note that, in FIGS. 17A to 17C, the mirror 4 shown in FIG. 16 is abbreviated to compare the split states of the object image. As shown in FIGS. 17A to 17C, by obtaining the object image split in the left-right direction (vertical direction in the drawings) via the image sensors 7 and 8, obtain a left-viewpoint image and a right-viewpoint image (3D image) having different parallaxes depending on the object distance can be obtained.

Moreover, another related art is disclosed in JP2009-168995A.

Techniques of photo-electrically converting a luminous fluxes passing through different regions of a pupil of a photographing optical system through the use of image sensors and detecting a focusing state of the photographing optical system based on a phase-difference between a first image signal and a second image signal obtained by the conversion are known in the art (JP2004-191629A and JP2009-244858A).

SUMMARY OF THE INVENTION

However, in the above-mentioned imaging devices, there is a problem of biased shading among plural viewpoint images in a pupil splitting direction.

For example, as shown in FIG. 18, plural viewpoint images can be obtained by introducing a luminous fluxes passing through a focus lens 12 to photo diodes (PDma, PDmb, PDca, PDcb and the like) arranged to correspond to each micro lens (Lm, Lc and the like). In this configuration, since the luminous flux is incident on a central part R1 of a light-receiving surface of a CCD 16 centered on an optical axis I0 of the focus lens 12 so as to be even in the X direction (left-right direction) about an optical axis of a micro lens, signals with uniform brightness are output from the photo diodes (PDca and PDcb). However, since the luminous flux is incident on peripheral parts R2 and R3 of the light-receiving surface of the CCD 16 so as to be uneven in the X direction (left-right direction), signals with uneven brightness are output from the photo diodes (PDma and PDmb). That is to say, the brightness is not constant among the plural viewpoint images in the peripheral part of the light-receiving surface of the CCD 16 in the pupil splitting direction X, thereby deteriorating the image quality.

Even in an imaging device employing a single photographing optical system, since the shading result from the chromatic aberration of the photographing optical system occurs in different directions among the plural viewpoint images, there is a problem as to how the shading correction should be performed for the R (red), G (green) and B (blue) colors having different wavelengths.

The present invention is made in consideration of the above-mentioned problems. Therefore, an object of the present invention is to provide a imaging device capable of favorably correcting biased shading of a plurality of viewpoint images photographed with each image having different light-reduction property (shading).

In order to achieve the above-described objects, the present invention provides an imaging device comprising, a single photographing optical system, an image sensor having a plurality of pixels for obtaining a plurality of viewpoint images by photo-electrically converting a luminous flux passing through different regions of the photographing optical system, and a shading correction part for conducting a shading correction to the plurality of viewpoint images, and the shading correction part varies the amount of shading correction based on light-reduction property for one viewpoint image among the plurality of viewpoint images with respect to the amount of shading correction based on light-reduction property for the other viewpoint image among the plurality of viewpoint images.

According to this configuration, by varying the amount of shading correction based on light-reduction property for one viewpoint image among the plurality of viewpoint images (for example, a right-viewpoint image and a left-viewpoint image) with respect to the amount of shading correction based on light-reduction property for the other viewpoint image, a biased shading of a plurality of viewpoint images photographed with each image having different light-reduction property can be corrected and a plurality of viewpoint images suitable for the stereoscopic displaying can be acquired.

Left-Right Direction

Further, the light-reduction property for the one viewpoint image may include a phase-difference shading generated by the difference of region of the photographing optical system passed through by the luminous flux corresponding to the one viewpoint image, and a lens shading generated by lens property of the photographing optical system, and the light-reduction property for the other viewpoint image may include a phase-difference shading generated by the difference of region of the photographing optical system passed through by the luminous flux corresponding to the other viewpoint image, and a lens shading generated by lens property of the photographing optical system.

Note that, the light-reduction property for the one viewpoint image includes the phase-difference shading and a lens shading, and in particular, the phase-difference shading is a shading specific to the viewpoint image corresponding to each luminous flux passing through different regions of the single photographing optical system Furthermore, the phase-difference shading may differ dependent on the region of the photographing optical system passed through by the luminous flux corresponding to each viewpoint image.

Note that, the lens shading is common among all viewpoint images, whereas phase-difference shading differs among each viewpoint image. Therefore, the light-reduction property (shading) of each viewpoint image are different, and as a result, the amount of shading correction are different for each viewpoint image.

Moreover, the image sensor may be a color image sensor having a color filter arranged to each pixel, and the shading correction part may vary the amount of shading correction of the plurality of viewpoint images acquired from the color image sensor for each color corresponding to the color filter.

Note that, by varying the amount of shading correction of the plurality of viewpoint images acquired from the color image sensor for each color corresponding to the color filter, an irregular color of the viewpoint images due to the usage of photographing optical system having chromatic aberration can be prevented Further, the image sensor may be a color image sensor having a plurality of pixels for each R (red), G (green) and B (blue) colors.

Furthermore, the image sensor may include a first pixel group and a second pixel group corresponding to a first pupil splitting direction and a third pixel group and a fourth pixel group corresponding to a second pupil splitting direction perpendicular with respect to the first pupil splitting direction among each luminous flux passing through different regions of the photographing optical system, and the shading correction part may vary the amount of shading correction based on light-reduction property for the viewpoint image corresponding to the first pixel group with respect to the amount of shading correction based on light-reduction property for the viewpoint image corresponding to the second pixel group, and varies the amount of shading correction based on light-reduction property for the viewpoint image corresponding to the third pixel group with respect to the amount of shading correction based on light-reduction property for the viewpoint image corresponding to the fourth pixel group.

For example, a 3D image (stereoscopic image) including a left-viewpoint image and a right-viewpoint image by both the horizontal photography and the vertical photography can be generated, and the biased shading can be prevented.

Moreover, the photographing optical system may include a zoom lens, and the shading correction part may change the amount of shading correction depending on the zoom position of the zoom lens. That is to say, it is possible to properly cope with the occurrence of different shading depending on the zoom position of the zoom lens.

Further, the photographing optical system may include a focus lens, and the shading correction part may change the amount of shading correction depending on the focus position of the focus lens. That is to say, it is possible to properly cope with the occurrence of different shading depending on the focus position of the focus lens.

Furthermore, the shading correction part may calculate the amount of shading correction using a function. That is to say, the table information of the shading correction value can be abbreviated to reduce the memory capacity necessary for the shading correction.

In the imaging device, the shading correction part may perform the shading correction based on a table value. That is to say, the shading correction can be performed in detail based on the table value.

Moreover, the image sensor may include a plurality of photo diodes arranged as the plurality of pixels on a light-receiving surface, a plurality of micro lenses arranged to correspond to the plurality of photo diodes, and a light-blocking member disposed between the plurality of photo diodes and the plurality of micro lenses, and the light-blocking member may divide the plurality of photo diodes into a plurality of pixel groups corresponding to the plurality of viewpoint images by blocking a part of the luminous flux reaching from an exit pupil of the photographing optical system to the micro lenses.

Further, a plurality of apertures respectively corresponding to the plurality of photo diodes may be formed in the light-blocking member, and the plurality of apertures may be arranged to lateralize from the optical axes of the micro lenses.

Furthermore, the light-blocking member may vary the light shielding amount by the light-blocking member for one pixel group among the plurality of pixel groups with respect to the light shielding amount for the other pixel group among the plurality of pixel groups based on the light-reduction property of the plurality of viewpoint images. That is to say, even with an optical system causing a difference in received light intensity in the pupil splitting direction that could not be compensated by the shading correction, the biased shading between the viewpoint images by physically reducing the difference in received light intensity between the pixel groups can surely be prevented.

Moreover, the image sensor may be a color image sensor having a color filter arranged to each pixel, and the light blocking member may vary the light shielding amount for each color of the color filter.

Further, the light shielding amount for the one pixel group may be smaller at one end in the pupil splitting direction of each luminous flux passing through different regions of the photographing optical system than that of the other end, and the light shielding amount for the other pixel group is larger at the one end in the pupil splitting direction than that of the other end.

According to the present invention, though a plurality of viewpoint images photo-electrically converted from a luminous flux passing through different regions of the photographing optical system photographed have different shading, by varying the amount of shading correction for these viewpoint images, a biased shading of a plurality of viewpoint images can be corrected and a plurality of viewpoint images suitable for the stereoscopic displaying can be acquired.

BRIEF DESCRIPTION OF THE DRAWINGS

FIG. 5A is a diagram illustrating the shading correction in a main pixel group and FIG. 5B is a diagram illustrating the shading correction in a sub-pixel group.

FIG. 6 is a flow diagram illustrating one example of the flow of a photographing process.

FIG. 8 is a flow diagram illustrating the flow of another example of photographing process.

FIGS. 9A, 9B and 9C are diagrams illustrating one exemplarily configurations of a CCD according to a second embodiment.

DESCRIPTION OF THE PREFERRED EMBODIMENTS

Hereinafter, embodiments of the present invention will be described in detail with reference to the accompanying drawings.

Figure 1:
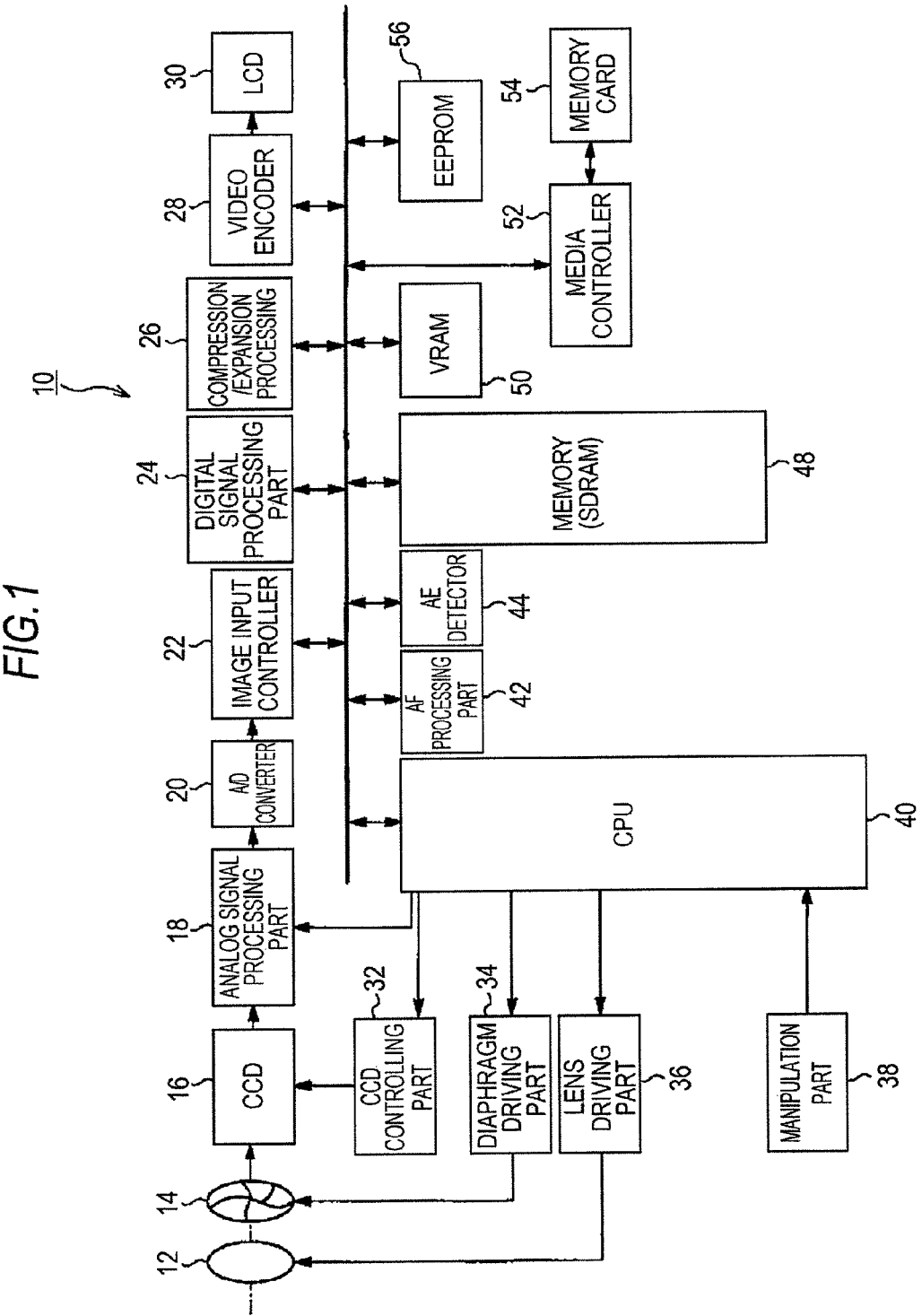
FIG. 1 is a block diagram illustrating one example of an imaging device.

FIG. 1 is a block diagram illustrating the configuration of an imaging device 10 according to embodiments of the present invention.

The imaging device 10 records captured images in a memory card 54, whereby the entire operation thereof is comprehensively controlled by a central processing unit (CPU) 40.

The imaging device 10 includes a manipulation part 38 having a shutter button, a mode dial, a play button, a MENU/OK key, a cross key and a BACK key. A signal from the manipulation part 38 is input to the CPU 40. The CPU 40 controls circuits of the imaging device 10 based on the input signal and performs, for example, lens driving control, diaphragm driving control, photographing operation control, image processing control, image data recording/playing control, and display control of a liquid crystal monitor 30 for stereoscopic display.

The shutter button is a manipulation button for inputting an initiation of photographing instruction and is formed of a 2-step stroke type switch having an S1 switch that is turned on at the time of half-pressing the shutter button and an S2 switch that is turned on at the time of fully-pressing the shutter button. The mode dial is a selection part for selecting any one of an auto photographing mode, a manual photographing mode, a scene position mode of person, landscape, night scene and the like, for capturing a still image and a moving image mode for capturing a moving image.

The play button is a button for switching to a play mode in which a still image or a moving image of a stereoscopic image (3D image) and a planar image (2D image) captured and recorded is displayed on the liquid crystal monitor 30. The MENU/OK key is a manipulation key having a function of a menu button instructing to display a menu on a screen of the liquid crystal monitor 30 and a function of an OK button instructing to determine and execute selected details. The cross key is a manipulation part for inputting an instruction in four directions of up, down, right, and left and serves as a button (cursor moving manipulation part) for selecting an item from the menu screen or instructing to select various setting items from the menus. The up/down key of the cross key serves as a zoom switch for capturing an image or a play zoom switch in the play mode, and the right/left key serves as a frame-by-frame play (forward/reward play) button in the play mode. The BACK key is used to delete a desired item such as a selected item, to cancel instructed details, or to return to the previous operating state.

In the photographing mode, image light representing an object is focused on the light-receiving surface of a solid-state image sensor (hereinafter, referred to as "CCD") 16 which is a phase-difference image sensor via a photographing optical lens 12 and a diaphragm 14. The photographing lens 12 is driven by a lens driving part 36 controlled by the CPU 40 and performs a focus control and a zoom control. The diaphragm 14 includes, for example, five diaphragm blades, is driven by a diaphragm driving part 34 controlled by the CPU 40, and the diaphragm value (F value) is controlled in five steps in every 1 AV from F2.8 to F11.

For example, a CCD (Charge Coupled Device) image sensor is used as the image sensor, but a different image sensor such as CMOS (Complementary Metal Oxide Semiconductor) image sensor or the like may be used.

The CPU 40 controls the diaphragm 14 through the use of the diaphragm driving part 34 and controls the charge storage time (shutter speed) in the CCD 16, the reading of image signals from the CCD 16 through the use of a CCD controlling part 32 or the like.

An EEPROM (Electrically Erasable and Programmable Read Only Memory) 56 stores a variety of setting information. For example, the EEPROM stores information (for example, table values or functions) necessary for the shading correction.

In the imaging device 10, the shading correction part according to the present invention is constructed by at least one of the CPU 40 and a digital signal processing part 24.

The shading correction according to the present invention will be described below in several embodiments.

First of all, a first embodiment will be described.

Figure 2:
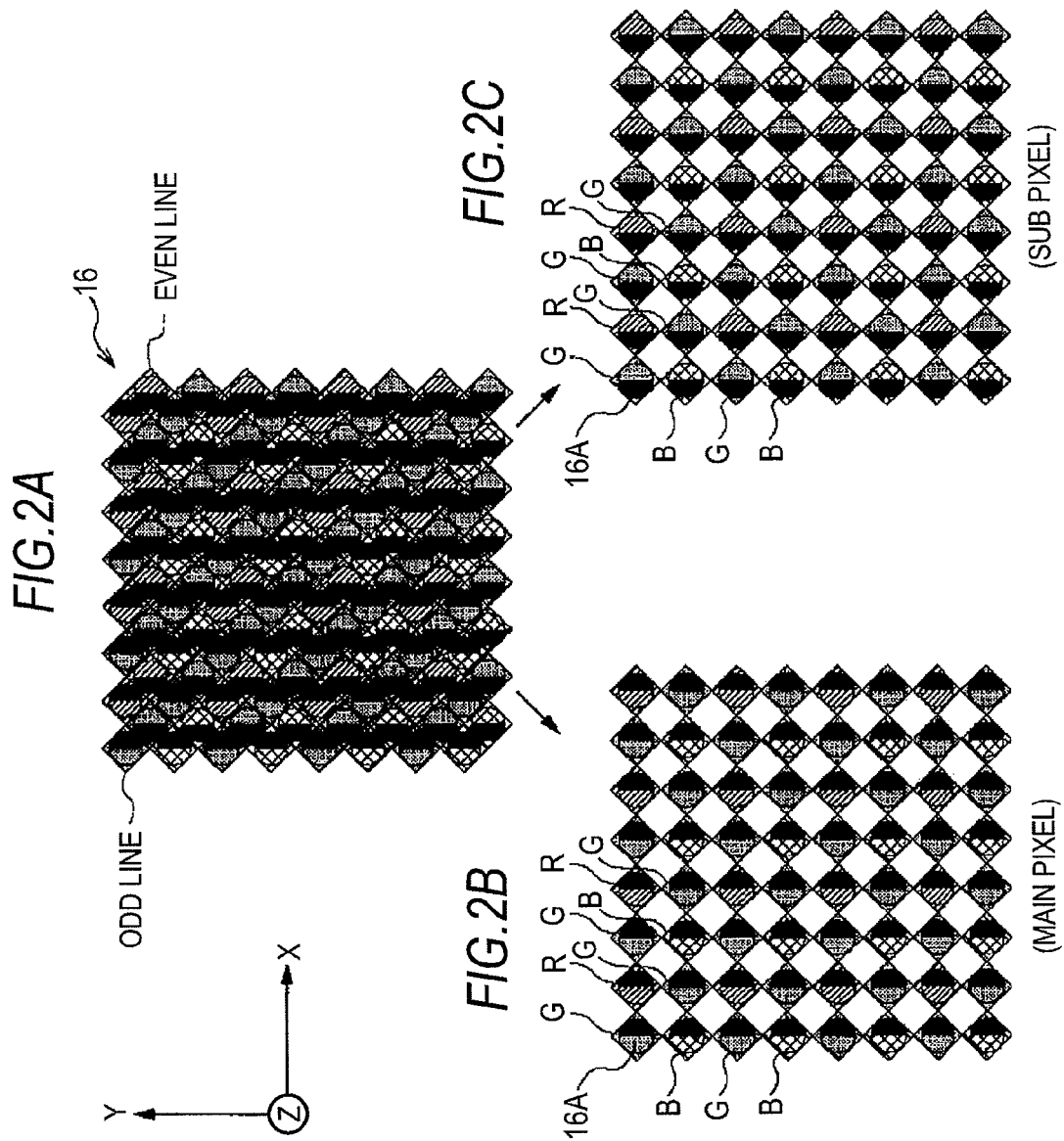
FIGS. 2A, 2B and 2C are diagrams illustrating one exemplarily configuration of a CCD having a honeycomb alignment according to a first embodiment.

FIGS. 2A to 2C are diagrams partially illustrating the configuration of the CCD 16. FIG. 2A illustrating a main pixel group and a sub-pixel group arranged in a honeycomb alignment, FIG. 2B illustrates only the main pixel group, and FIG. 2C illustrates only the sub-pixel group.

As shown in FIGS. 2A to 2C, the CCD 16 includes main pixels (hereinafter, also referred to as "A-face pixel") of odd lines in the vertical direction (Y-axis direction in the drawings) and sub-pixels (hereinafter, also referred to as "B-face pixels") of even lines in the vertical direction, which all arranged in a matrix shape, and independently reads out pixel signals photo-electrically converted by the main pixel group and the sub-pixel group as main-viewpoint images (A-face images) and sub-viewpoint images (B-face images).

As shown in FIGS. 2A to 2C, out of the pixels having color filters of R (red), G (green) and B (blue), horizontal lines having a pixel arrangement of GRGR . . . and horizontal lines having a pixel arrangement of BGBG . . . are alternately arranged in the odd lines (1, 3, 5, . . . ) of the CCD 16. On the other hand, regarding the pixels of the even lines (2, 4, 6, . . . ), horizontal lines having a pixel arrangement of GRGR . . . and horizontal lines having a pixel arrangement of BGBG . . . are alternately arranged, similarly to the odd lines, and the pixels are eccentrically displaced by a half pitch from the pixels of the odd lines in the line direction.

Figure 3:
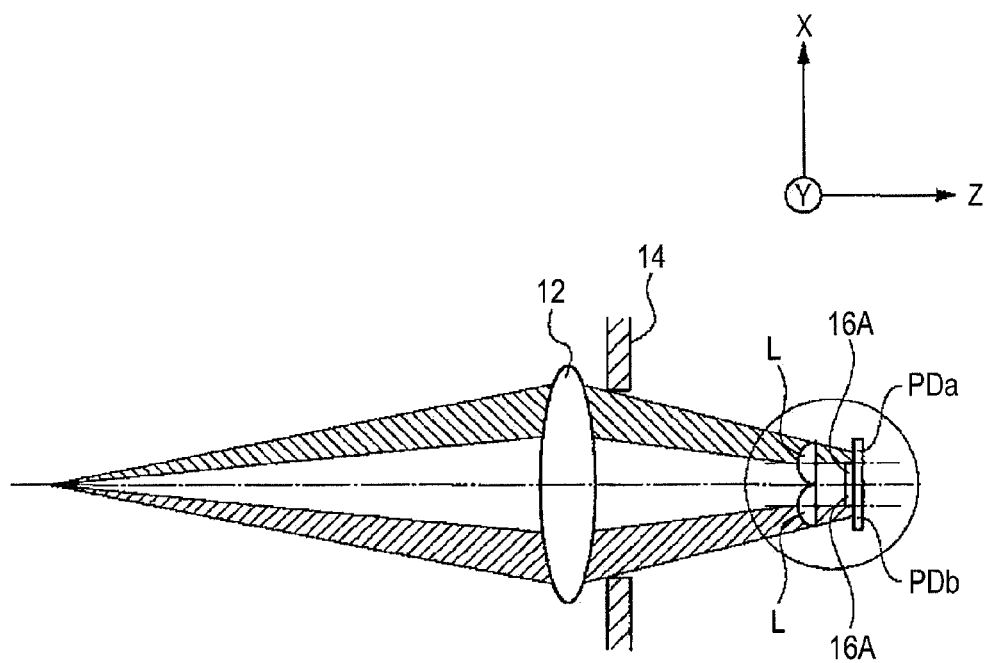
FIG. 3 is a diagram schematically illustrating the principle of monocular stereoscopic imaging.
Figure 4A:
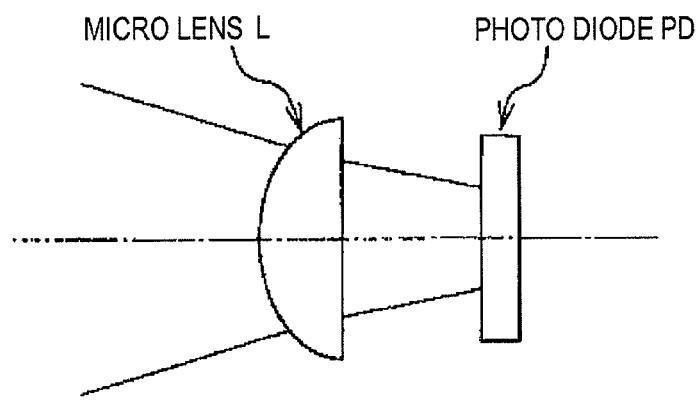
FIG. 4A is a partially enlarged view illustrating a pixel according to the related art and FIG. 4B is a partially enlarged view illustrating a pixel according to the present invention.
Figure 4B:
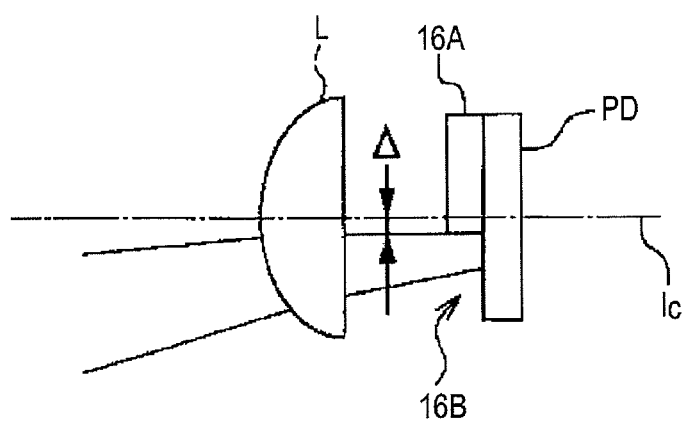

FIG. 3 is a diagram schematically illustrating the photographing lens 12, the diaphragm 14, one main pixel PDa, and one sub-pixel PDb of the CCD 16. FIGS. 4A and 4B are partially enlarged views of FIG. 3.

FIG. 4A shows a pixel (photo diode) of a CCD according to the related art and the periphery thereof. In the related art, a luminous flux passing through an exit pupil of the photographing lens 12 is incident on the photo diode PD through a micro lens L without blocking (shielding).

FIG. 4B shows a pixel of a CCD according to the present invention and the periphery thereof. A light-blocking member 16A is formed on the photo diodes PD of the CCD 16 and a left half or a right half of the light-receiving surface of each photo diode PD is shielded by the light-blocking member 16A in this example. By forming the light-blocking member 16A with changed A (eccentrically-displaced distance from the optical axis IC of the micro lens L) in the drawing, that is, by changing the area (the light shielding amount) of the light-blocking member 16A, it is possible to change the received light intensity of each photo diode PD. In other words, the received light intensity of each photo diode PD can be changed by changing the area (aperture area) of an aperture 16B of the light-blocking member 16A.

In the CCD 16 having the above-mentioned configuration, the main pixels and the sub-pixels are configured so as to have different regions (a right half and a left half) in which the luminous flux is regulated by the light-blocking member 16A, but the present invention is not limited to this configuration. The micro lens L and the photo diode PD may be relatively displaced in the left-right direction without providing the light-blocking member 16A and the luminous flux incident on the photo diode PD may be regulated depending on the displacement direction, or the luminous flux incident on each pixel may be regulated by providing a single micro lens to two pixels (the main pixel and the sub-pixel).

As shown in FIG. 3, the light-blocking area in which the luminous flux is regulated (blocked) by the light-blocking member 16A is different in the main pixel PDa and the sub-pixel PDb. That is to say, the light-blocking member 16A has a function of a pupil splitting member, causes a luminous flux passing through one half of the exit pupil out of the luminous flux passing through the exit pupil of the photographing lens 12 to be incident on the main pixel PDa, and causes a luminous flux passing through the other half of the exit pupil to be incident on the sub-pixel PDb.

FIG. 3 schematically illustrates that the luminous flux passing through the right half of the exit pupil is incident on the main pixel PDa and the luminous flux passing through the left half of the exit pupil is incident on the sub-pixel PDb, but it depends on the structures of the micro lenses L, the light-blocking member 16A, and the photo diodes PD (pixels) whether the luminous flux passing through either half (the right half or the left half) of the exit pupil should be incident on the main pixel PDa (or the sub-pixel PDb).

In this embodiment, it is described that a pupil is split in the horizontal direction (in the X-axis direction in FIG. 3), but the present invention is not particularly limited to this case. The pupil may be split in the vertical direction or the pupil may be split in both the horizontal direction and the vertical direction.

Referring to FIG. 1 again, signal charges stored in the CCD 16 are read out as a voltage signal corresponding to the signal charges based on a reading signal sent from the CCD controlling part 32. The voltage signal read out from the CCD 16 is sent to an analog signal processing part 18, and R, G and B signals (pixel signals of R, G and B colors) are sampled and held therein for each pixel and are amplified and sent to an A/D converter 20. The A/D converter 20 converts the sequentially input pixel signals into digital pixel signals and outputs the digital pixel signals to an image input controller 22.

The digital signal processing part 24 performs a predetermined signal process such as an offset process, a gain control process including white balance correction and sensitivity correction, a gamma correcting process, and an YC process on the digital pixel signals input via the image input controller 22.

Here, as shown in FIGS. 2B and 2C, the pixel signals read out from the main pixels of the odd lines of the CCD 16 are processed as one viewpoint image (main viewpoint image) and the pixel signals read out from the sub-pixels of the even lines are processed as the other viewpoint image (sub viewpoint image).

The main viewpoint image and the sub viewpoint image (3D image) processed by the digital signal processing part 24 are input to a VRAM 50. The VRAM 50 includes an A region and a B region storing the 3D image data representing 3D images of a frame. The 3D images of a frame are alternately rewritten in the A region and the B region in the VRAM 50. Out of the A region and the B region of the VRAM 50, the written 3D image is read out from the region other than the region to which the 3D image is being rewritten. The 3D image read out from the VRAM 50 is encoded by a video encoder 28 and is output to the liquid crystal monitor 30 for stereoscopic display disposed on the rear surface of a camera, whereby a 3D object image is displayed on a display screen of the liquid crystal monitor 30.

The liquid crystal monitor 30 is a stereoscopic display part that can display a 3D image (the main viewpoint image and the sub viewpoint image) as directional images having predetermined directionalities by a parallax barrier, but is not limited to this configuration. The viewpoint images may be individually viewed by using a lenticular lens or wearing dedicated glasses such as polarization glasses or liquid crystal shutter glasses.

When the shutter button of the manipulation part 38 is pressed in a first step (halfway pressing), the CCD 16 starts an AF operation and an AE operation and controls the lens driving part 36 to locate the focus lens of the photographing lens 12 at a focus position. When the shutter button is pressed halfway, the image data output from the A/D converter 20 is received by an AE detector 44.

The AE detector 44 integrates G signals of the entire screen or integrates G signals weighted differently in the central part and the peripheral part of the screen and outputs the integrated value to the CPU 40. The CPU 40 calculates the brightness (photographing Ev value) of the object from the integrated value input from the AE detector 44, determines a diaphragm value of the diaphragm 14 and an electronic shutter (shutter speed) of the CCD 16 using a predetermined program diagram based on the photographing Ev value, controls the diaphragm 14 through the use of the diaphragm driving part 34 based on the determined diaphragm value, and controls the charge storage time in the CCD 16 through the use of the CCD controlling part 32 based on the determined shutter speed.

An AF processing part 42 is a part performing a contrast AF process or a phase AF process. When the contrast AF process is performed, the AF processing part calculates an AF evaluated value representing the focusing state by extracting high-frequency components of the image data in a predetermined focus region in at least one of the main viewpoint image and the sub viewpoint image and integrating the high-frequency components. The AF control is performed by controlling the focus lens of the photographing lens 12 so as to maximize the AF evaluated value. When the phase AF process is performed, the AF processing part detects a phase-difference in image data corresponding to the main pixels and the sub-pixels in a predetermined focus region in the main viewpoint image and the sub viewpoint image and calculates a defocus amount based on information representing the phase-difference. The AF control is performed by controlling the focus lens of the photographing lens 12 so that the defocus amount is 0.

When the AE operation and the AF operation are finished and the shutter button is pressed in a second step (fully), image data of two images of the main viewpoint image (main image) and the sub viewpoint image (sub image) corresponding to the main pixels and the sub-pixels and being output from the A/D converter 20 in response to the full press are input from the image input controller 22 to a memory (SDRAM) 48 and temporarily stored therein.

The image data of two images temporarily stored in the memory 48 are properly read out by the digital signal processing part 24 and is subjected to a predetermined signal process including a process (YC process) of generating brightness data and color difference data of the image data therein. The YC-processed image data (YC data) are stored in the memory 48 again. Subsequently, the YC data of two images are output to a compression/expansion processing part 26, is subjected to a predetermined compression process such as JPEG (Joint Photographing Experts Group), and is then stored in the memory 48 again.

A multi-picture file (MP file which is a type of file in which plural images are coupled) is generated from the YC data (compressed data) of two images stored in the memory 48. The MP file is read out by a media controller 52 and is recorded in the memory card 54.

As described above, the CCD 16 includes plural pixels for each color of R (red), G (green), and B (blue) and acquires plural viewpoints images by photo-electrically converting a luminous flux passing through different regions (for example, the right half and the left half) on the exit pupil of the photographing lens 12.

The shading correction in a shading correction part (the CPU 40 or the digital signal processing part 24) according to this embodiment will be described below. An amount of shading correction in a pupil splitting direction (left-right direction in this embodiment) varies among the plural viewpoint images (the main viewpoint image and the sub viewpoint image) and the amount of shading correction in the pupil splitting direction varies depending on the R, G and B colors.

FIGS. 5A and 5B are diagrams illustrating the received light intensities of R, G and B pixels in the main pixel group and the sub-pixel group. In the main pixel group shown in FIG. 5A and the sub-pixel group shown in FIG. 5B, the received light intensities of the pixels are smaller in the peripheral part (R2, R3, R4 and R5) than in the central part R1. In the main pixel group shown in FIG. 5A, the received light intensity in the right side in the drawing is smaller than that in the left side in the pupil splitting direction X (left-right direction). In the sub-pixel group shown in FIG. 5B, the received light intensity in the left side in the drawing is smaller than that in the right side in the pupil splitting direction X (left-right direction).

The shading correction part in this embodiment performs the shading correction on the pixel signals (main viewpoint image) output from the pixels of the main pixel group for each color of R, G and B with a higher amount in the peripheral part R3 close to the right end in the drawing in the pupil splitting left-right direction (horizontal direction) than that in the peripheral part R2 close to the left end in the drawing, and performs the shading correction on the pixel signals (sub viewpoint image) output from the pixels of the sub-pixel group with a lower amount in the peripheral part R3 close to the right end in the drawing in the pupil splitting left-right direction than that in the peripheral part R2 close to the left end in the drawing (the amount of shading correction is higher in R2 than in R3).

The shading correction part in this embodiment concentrically increases the amount of shading correction on the viewpoint images (the main viewpoint image and the sub viewpoint image) as it goes distant from the center of each viewpoint image with reference to the center point corresponding to the optical axis of the photographing lens 12.

The pupil splitting direction in an image corresponds to a pupil splitting direction in an actual space (i.e., a direction connecting the split regions of a pupil of the photographing lens 12). In this embodiment, since the pupil is split into a left half and a right half, the pupil splitting direction is the left-right direction (X direction). As shown in FIG. 3, when the optical axis of the photographing lens 12 is not bent but is straightly directed to the CCD 16, the pupil splitting direction in the CCD 16 is the left-right direction (X direction). That is to say, in a so-called bent optical system, the pupil splitting direction is the direction obtained by projecting the pupil splitting direction in the photographing lens 12 onto the light-receiving surface of the CCD 16 along the bent optical path.

FIG. 6 is a flow diagram illustrating the flow of an imaging process in the imaging device according to the present invention.

In step S101, the automatic exposing (AE) process is performed by the AE detector 44 and the CPU 40. That is to say, the brightness of an object is detected and the diaphragm and the shutter speed are controlled.

In step S102, the automatic focusing (AF) process is performed by the AF processing part 42 and the CPU 40.

In step S103, the pixels of the CCD 16 are exposed under the control of the CCD controlling part 32.

In step S104, stored charges are read out from the pixels of R, G and B colors for each of the A-face pixel group (main pixel group) and the B-face pixel group (sub-pixel group) under the control of the CCD controlling part 32 and the pixel signals of R, G and B colors are acquired. That is to say, the main viewpoint image (right-eye image) including the pixel signals of the A-face pixel group and the sub viewpoint image (left-eye image) including the pixel signals of the B-face pixel group are generated.

In step S105, the plural viewpoint images (the main viewpoint image and the sub viewpoint image) are converted in an A/D conversion manner by the A/D converter 20 and are written to the memory 48 by the image input controller 22.

In step S106, the position of the zoom lens (zoom position) and the position of the focus lens (focus position) are determined.

In steps S107 to S109, the CPU 40 performs the phase-difference shading correction on the pixel signals of the R, G and B colors of the main pixel group and the sub-pixel group in the pupil splitting left-right direction X.

Note that, the phase-difference shading herein represents a light-reduction property (shading) due to the lateralization of the center of the luminous flux from the lens optical axes, wherein the luminous flux had passed through different region of photographing lens in left-right direction.

Figure 7A:
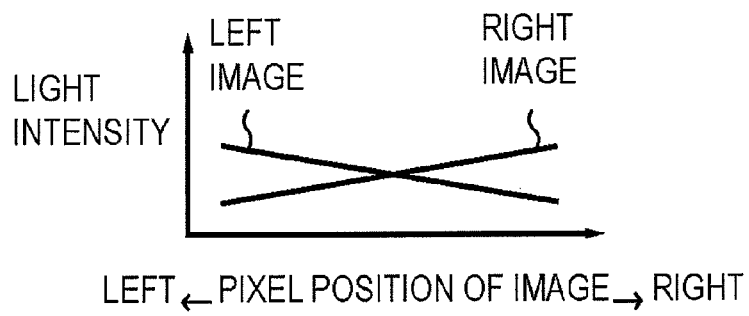
FIGS. 7A to 7C are graphs respectively showing light-reduction property by phase-difference, light-reduction property by lens, and, light-reduction property by lens and phase-difference.

As shown in FIG. 7A, the phase-difference shading will change almost in linear depending on the pixel position in left-right direction, i.e. in the pupil splitting direction of each viewpoint image. In the left image, a light-reduction will increase more and more in the right direction, whereas in the right image, a light-reduction will increase more and more in the left direction.

Accordingly, by changing the amount of phase-difference shading correction in the main viewpoint image and the sub viewpoint image in the pupil splitting direction X and changing the amount of phase-difference shading correction in the pupil splitting direction X depending on the R, G and B colors, the CPU performs the phase-difference shading correction on the viewpoint images for each of R, G and B.

For example, when the correction coefficient for the pixels in the vicinity of the centers of the main pixel group and the sub-pixel group is set to "1", the shading correction coefficients proportional to 100/45, 100/40, and 100/35 are multiplied by the pixel values of R, G and B, respectively, at the left end of the main pixel group shown in FIG. 5A and the shading correction coefficients proportional to 100/15, 100/20 and 100/25 are multiplied by the pixel values of R, G and B, respectively, at the right end. The shading correction coefficients proportional to 100/45, 100/40, and 100/35 are multiplied by the pixel values of R, G and B, respectively, at the right end of the sub-pixel group shown in FIG. 5B and the shading correction coefficients proportional to 100/15, 100/20 and 100/25 are multiplied by the pixel values of R, G and B, respectively, at the left end. The amount of shading correction is slowly changed in the pupil splitting direction X.

In step S110, the CPU 40 concentrically performs the lens shading correction on the pixel signals of the R, G and B colors in the main pixel group and the sub-pixel group. Note that, the lens shading herein represents a light-reduction property (shading) due to the normal photographing of 2D image, and is mainly caused by the lens property of photographing lens 10.

Figure 7B:
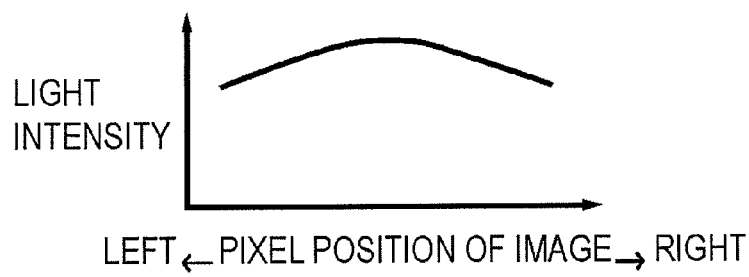

As shown in FIG. 7B, in the lens shading, the light-reduction is smallest in the center of the image (center of light axes), whereas, the light-reduction will increase more and more in the radial outward direction from the center of the image. That is to say, the amount of lens shading correction will increase in a concentric shape as it goes distant form the center of each viewpoint image with reference to the optical axis of the photographing lens 12.

In this embodiment, the CPU 40 calculates the shading correction coefficients using a function. For example, a quadratic function is used in the phase-difference shading in one direction to calculate the shading correction coefficient and a quartic function is used in the lens shading in the concentric shape to calculate the shading correction coefficient. Moreover, FIG. 7C shows a graph of shading of left and right viewpoint images by adding up the phase-difference shading shown in FIG. 7A and the lens shading shown in FIG. 7B.

In the embodiment as mentioned above, the lens shading correction is performed after the phase-difference shading, however, the lens shading correction can be performed prior to the phase-difference shading.

Figure 7C:
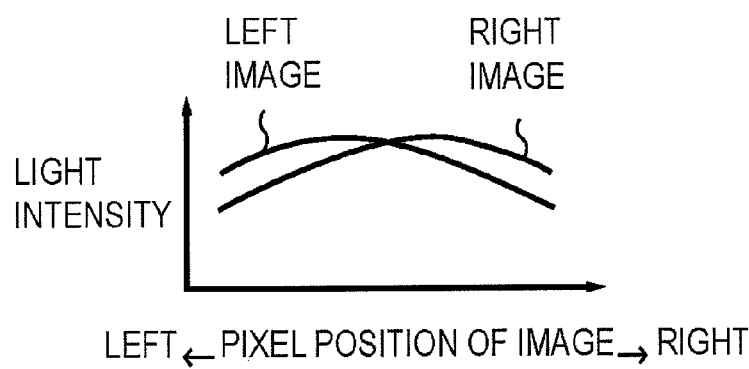

Alternatively, as shown in FIG. 7C, the amount of shading correction for each viewpoint image (different amount of shading correction for the left and right viewpoint image respectively) can be calculated by adding up the phase-difference shading and the lens shading, and then the phase-difference shading and the lens shading can be performed at the same time using the added up and calculated amount of shading correction.

The shading correction value is changed depending on the zoom position and the focus position acquired in step S106 by the CPU 40. That is to say, the shading correction value varies depending on the zoom position or the focus position.

In step S111, various digital signal processes are performed by the digital signal processing part 24 and the compression process is performed by the compression/expansion processing part 26.

In step S112, the plural viewpoint images are recorded on the memory card 54 by the media controller 52.

FIG. 8 is a flow diagram illustrating the flow of another imaging process in the imaging device according to the present invention.

The processes of steps S201 to S206 are the same as the processes of steps S101 to S106 shown in FIG. 6 described above.

In step S207, the shading correction (the phase-difference shading correction and the lens shading correction) is performed based on a correction table stored in advance in the EEPROM 56 by the digital signal processing part 24. The details of the phase-difference shading correction and the lens shading correction are the same as described in steps S107 to S110 shown in FIG. 6. In this embodiment, the shading correction is performed based on the values of the correction table (table values) without using the function.

The shading correction value is changed depending on the zoom position and the focus position acquired in step S206. That is to say, the shading correction value is variable depending on the zoom position and the focus position.

For example, various correction tables for the zoom position and the focus position are stored in the EEPROM 56, and the CPU 40 selects a proper correction table based on the zoom position and the focus position, reads out the selected correction table from the EEPROM 56, and sets the read-out correction table in the digital signal processing part 24.

The processes of steps S208 to S209 are the same as the processes of steps S111 to S112 shown in FIG. 6.

The flow of processes shown in FIGS. 6 and 8 is only an example and different flows of processes may be employed. For example, one of the phase-difference shading correction and the lens shading correction may be performed using a function and the other may be performed using the table values. The shading correction may be performed based on only one of the zoom position and the focus position or the shading correction may be performed regardless of the zoom position and the focus position.

A second embodiment of the present invention (where plural pupil splitting directions exist) will be described below.

FIG. 9A shows an arrangement of main pixels+sub-pixels, FIG. 9B shows an arrangement of only the main pixels, and FIG. 9C shows an arrangement of only the sub-pixels.

The CCD 16 in this embodiment includes plural pixel group pairs (pixel group sets) corresponding to plural pupil splitting directions (the X direction and the Y direction in the drawings). Specifically, the CCD 16 includes a first pixel group pair 61 including a first main pixel group 61a and a first sub-pixel group 61b corresponding to a first pupil splitting direction (the X direction in the drawings) and a second pixel group pair 62 including a second main pixel group 62a and a second sub-pixel group 62b corresponding to a second pupil splitting direction (the Y direction in the drawings).

The imaging device 10 according to this embodiment acquires the left viewpoint image and the right viewpoint image from the first pixel group pair 61a and 61b at the time of horizontal photography (that is, when the X axis is horizontal in FIG. 9A), and acquires the left viewpoint image and the right viewpoint image from the second pixel group pair 62a and 62b at the time of vertical photography (that is, when FIG. 9A rotates by 90 degrees and the X axis is vertical).

The shading correction part (for example, the CPU 40 or the digital signal processing part 24 in FIG. 1) in this embodiment changes the amount of shading correction on the pixel signal of R, G and B colors output from the pixel group pairs 61 and 62 depending on the pupil splitting directions (the X direction and the Y direction). Specifically, the shading correction part changes the amount of shading correction for the main pixel group 61a and the sub-pixel group 61b in the peripheral part in the X direction when performing the shading correction on the pixel signal of R, G and B colors output from the main pixel group 61a and the sub-pixel group 61b of the first pixel group pair 61, and changes the amount of shading correction for the main pixel group 62a and the sub-pixel group 62b in the peripheral part in the Y direction when performing the shading correction on the pixel signal of R, G and B colors output from the main pixel group 62a and the sub-pixel group 62b of the second pixel group pair 62.

The relationship of the photo diode PD, the micro lens L, and the light-blocking member 16A in each pixel group pair is the same as described in the first embodiment and thus is not described here.

A third embodiment of the present invention (where the phase-difference shading amount of a pixel is physically adjusted) will be described below.

Figure 10:
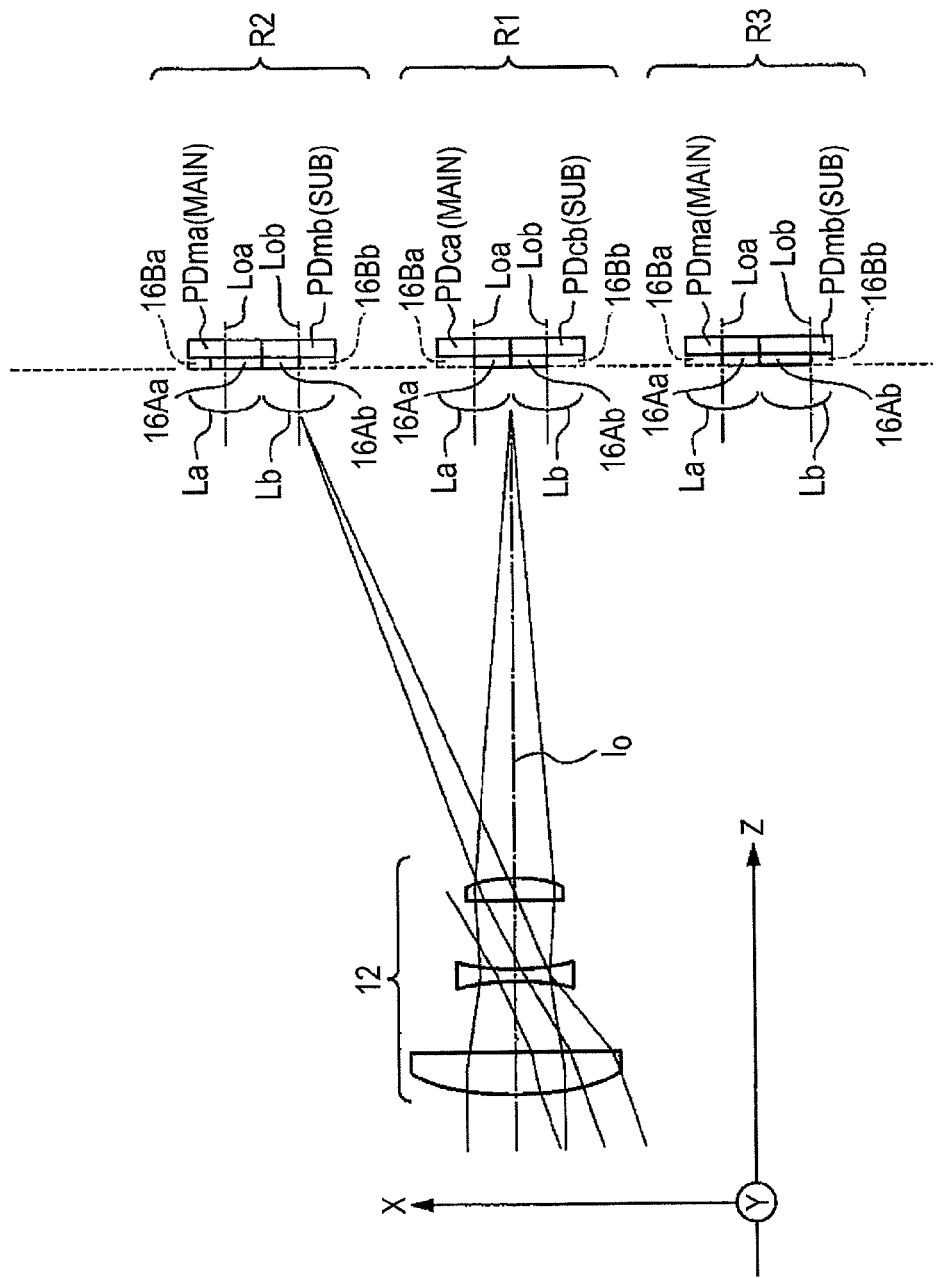
FIG. 10 is a diagram illustrating one exemplarily configuration of a CCD according to a third embodiment.

FIG. 10 is a diagram schematically illustrating a part of the CCD 16 in this embodiment.

As shown in FIG. 10, in the central part R1 of the light-receiving surface, the light-blocking area of the light-blocking member 16Aa for the main pixel PDca (photo diodes of the main pixel group) and the light-blocking area of the light-blocking member 16Ab for the sub-pixel PDcb (photo diodes of the sub-pixel group) are equal to each other. That is to say, the aperture area of the aperture 16Ba for the main pixel PDca and the aperture area of the aperture 16Bb for the sub-pixel PDcb are equal to each other. In the peripheral parts R2 and R3 in the pupil splitting direction (X direction) of the light-receiving surface, the light-blocking area of the light-blocking member 16Aa for the main pixel PDma and the light-blocking area of the light-blocking member 16Ab for the sub-pixel PDmb are different from each other. That is to say, the aperture area of the aperture 16Ba for the main pixel PDma and the aperture area of the aperture 16Bb for the sub-pixel PDmb are different from each other.

FIG. 10 does not show the pixels between the central part R1 and the peripheral parts R2 and R3, but the difference between the light-blocking area of the light-blocking member 16Aa for the main pixel and the light-blocking area of the light-blocking member 16Ab for the sub-pixel increases as it goes from the central part R1 of the light-receiving surface to the peripheral parts R2 and R3. Specifically, the light-blocking area for the main pixel increases from the central part R1 to the peripheral part R2 and decreases from the central part R1 to the peripheral part R3. On the other hand, the light-blocking area for the sub-pixel decreases from the central part R1 to the peripheral part R2 and increases from the central part R1 to the peripheral part R3.

In this way, by increasing the difference between the light shielding amount of the main pixel and the light shielding amount of the sub-pixel in the pupil splitting direction X as it goes from the central part of the light-receiving surface to the peripheral part, the difference between the incident light intensity of the main pixel and the incident light intensity of the sub-pixel in the peripheral part of the light-receiving surface is reduced, thereby suppressing the occurrence of phase-difference shading between the viewpoint images.

Figure 11:
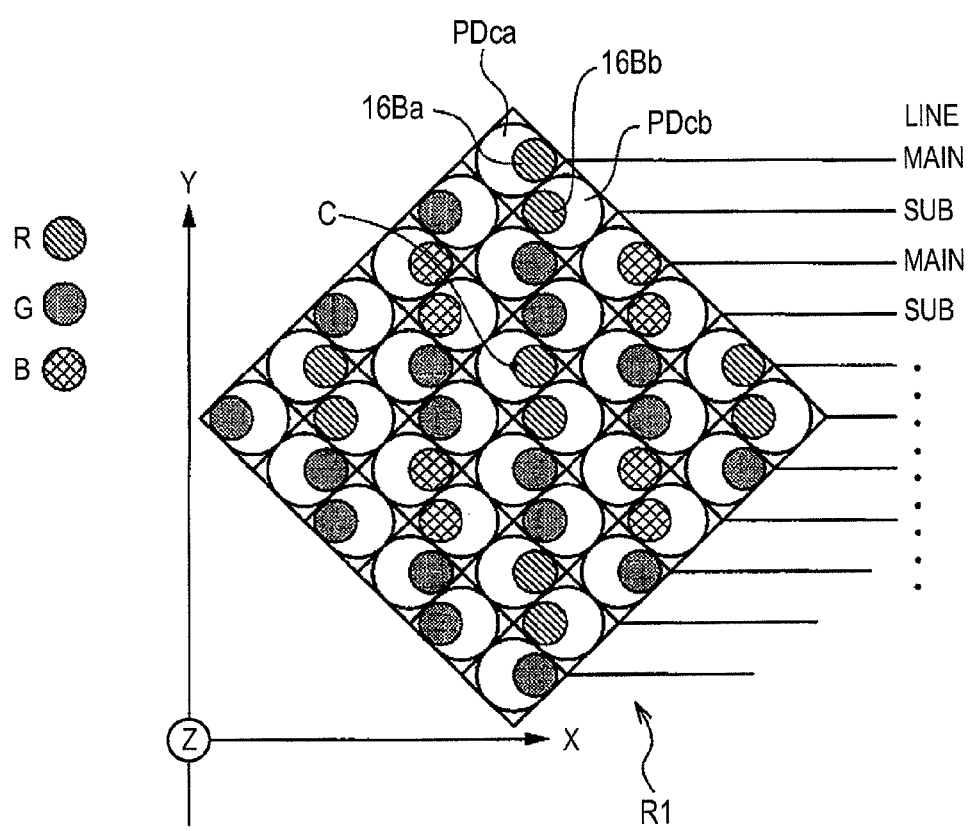
FIG. 11 is a perspective plan view illustrating a central part of one exemplarily CCD having a honeycomb alignment according to the third embodiment.
Figure 12:
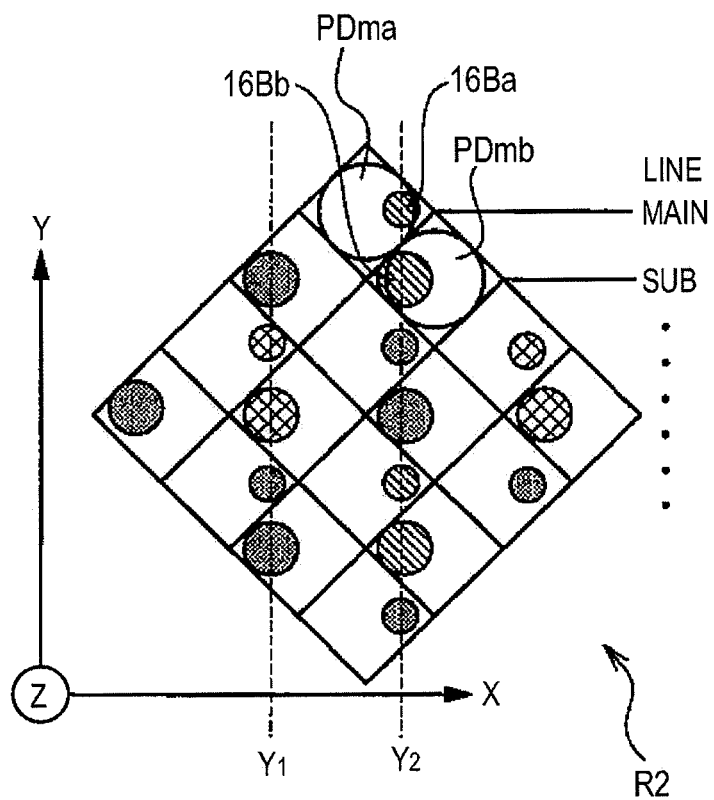
FIG. 12 is a perspective plan view illustrating a peripheral part of one exemplarily CCD having a honeycomb alignment according to the third embodiment.

An example of a pixel arrangement and an aperture arrangement of the CCD 16 will be described below. FIG. 11 is a perspective plan view illustrating the central part R1 in the light-receiving surface of the CCD 16. FIG. 12 is a perspective plan view illustrating one peripheral part R2 in the pupil splitting direction X of the light-receiving surface of the CCD 16. In this example, as shown in FIGS. 11 and 12, plural apertures 16B (16Ba and 16Bb) corresponding to the plural photo diodes PD (PDca and PDcb in FIG. 11 and PDma and PDmb in FIG. 12) having a honeycomb alignment are formed in the light-blocking member 16A. The apertures 16Ba and 16Bb are eccentrically displaced from the optical axes Lo (Loa and Lob in FIG. 10) of the micro lenses L (La and Lb in FIG. 10), as shown in FIG. 10.

In FIG. 11, the optical axis (Io in FIG. 10) of the photographing lens 12 extending in the Z direction passes through the light-receiving surface at a position C in the middle way. FIG. 11 shows photo diodes PD (PDca and PDcb) of R, G and B colors arranged in the central part R1 (that is to say, in the vicinity of the position C) of the light-receiving surface and the apertures 16B (16Ba and 16Bb) arranged between the photo diodes PD and the micro lenses L.

In the pixel group (36 (=6×6) photo diodes here) in the central part R1, the apertures 16Ba corresponding to the main pixels PDca and the apertures 16Bb corresponding to the sub-pixels PDcb are equal to each other in aperture area. In this example, the aperture areas of the plural apertures are equal to each other in the left-right direction (pupil splitting direction) X and the vertical direction (direction perpendicular with respect to the pupil splitting direction) Y of the light receiving surface. The positions of the apertures 16Ba and 16Bb corresponding to the pixels PDca and PDcb in the central part R1 are eccentrically displaced from the optical axes Lo (Loa and Lob) of the micro lenses L (La and Lb) with a constant distance to the left and right sides in the X axis direction.

FIG. 12 shows the photo diodes PD (PDma and PDmb) of R, G and B colors arranged in one peripheral part R2 in the pupil splitting direction X of the light-receiving surface and the apertures 16B (16Ba and 16Bb) arranged between the photo diodes PD and the micro lenses L.

In the pixel group (16(=4×4) photo diodes here) in the peripheral part R2, the apertures 16Ba corresponding to the main pixels PDma and the apertures 16Bb corresponding to the sub-pixels PDmb are different from each other in aperture area. That is to say, the aperture areas of the apertures 16Ba corresponding to the main pixels in the peripheral part R2 are smaller than the aperture areas of the apertures 16Bb corresponding to the sub-pixels. In other words, the light shielding amount in the main pixels in the peripheral part R2 is greater than that in the sub-pixels. The aperture areas of the apertures 16Bb of the sub-pixels in the peripheral part R2 shown in FIG. 12 is equal to the aperture areas of the apertures 16Bb of the sub-pixel in the central part R1 shown in FIG. 11, but may be greater.

In the other peripheral part R3 shown in FIG. 10, the aperture area of the aperture 16Bb corresponding to a sub-pixel is set to be smaller than the aperture area of the aperture 16Ba corresponding to a main pixel. In other words, the light shielding amount of the sub-pixel in the peripheral part R3 is greater than the light shielding amount of the main pixel. In this example, the aperture area of the aperture 16Bb corresponding to the sub-pixel in the peripheral part R3 is equal to the aperture area of the aperture 16Bb corresponding to the sub-pixel in the central part R1 shown in FIG. 11, but may be smaller.

In this example, in one peripheral part R2 in the pupil splitting direction X of the light-receiving surface, the light-blocking area of the luminous flux incident on the main pixel is greater than that on the sub-pixel. In the other peripheral part R3, the light-blocking area of the luminous flux incident on the sub-pixel is greater than that on the main pixel. Accordingly, the incident light intensities of the pupil-split luminous flux on the maxi pixel and the sub-pixel are substantially equal to each other, thereby reducing the occurrence of phase-difference shading in the viewpoint images.

Figure 13:
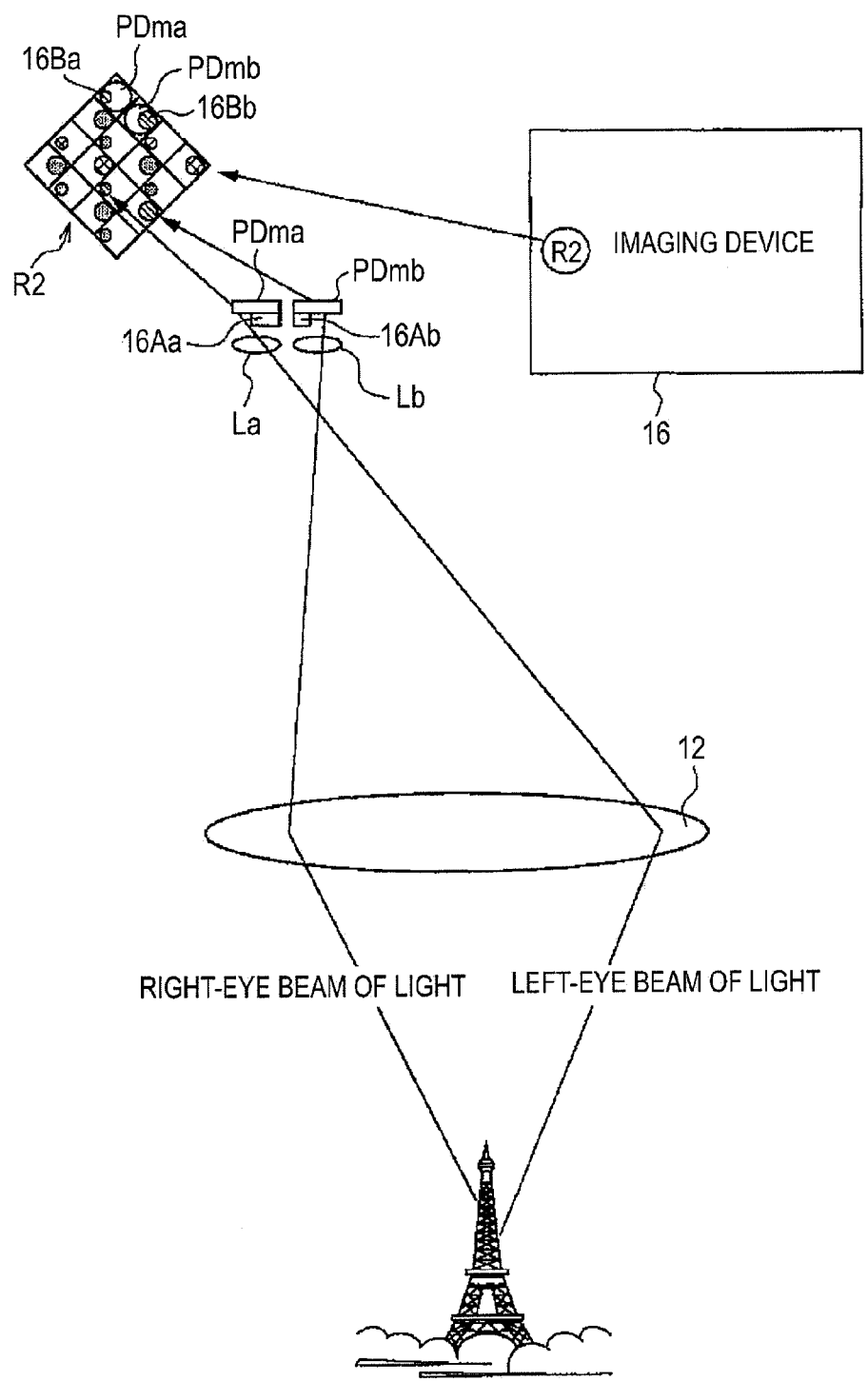
FIG. 13 is a diagram illustrating the relationship of a luminous flux passing through a photographing lens at the time of imaging an object and pixels in a peripheral part of an image sensor.

FIG. 13 shows the relationship between the luminous flux passing through the photographing lens 12 and the pixels PDma and PDmb in the peripheral part R2 of the image sensor 16 at the time of imaging an object. The left-eye luminous flux passing through the photographing lens 12 passes through the micro lens La for the main pixel and is incident on the main pixel PDma. The left-eye luminous flux passing through the photographing lens 12 passes through the micro lens Lb for the sub-pixel but is blocked by the light-blocking member 16Ab, and thus is not incident on the sub-pixel PDmb. The right-eye luminous flux passing through the photographing lens 12 passes through the micro lens Lb for the sub-pixel and is incident on the sub-pixel PDmb. The right-eye luminous flux passing through the photographing lens 12 passes through the micro lens La for the main pixel but is blocked by the light-blocking member 16Aa, and thus is not incident on the main pixel PDma.

The CPU 40 performs the shading correction on the pixel signals read out from the main pixels and the sub-pixels in the peripheral part R2 based on the difference in light shielding amount between the main pixels and the sub-pixels in the peripheral part R2.

In the other peripheral part R3, the difference in light shielding amount between the main pixels and the sub-pixels is opposite to that in one peripheral part R2. The CPU 40 also performs the shading correction on the pixel signals read out from the main pixels and the sub-pixels in the other peripheral part R3 based on the difference in light shielding amount between the main pixels and the sub-pixels.

In this embodiment, since the light shielding amount of the main pixel PDma in one peripheral part R2 is set to be greater than the light shielding amount of the sub-pixel PDmb, the difference in light intensity between the main pixel PDma and the sub-pixel PDmb before the shading correction is reduced, thereby surely performing the shading correction.

The positions and the shapes of the apertures 16B are not limited to those shown in FIGS. 11 to 13.

Figure 14:
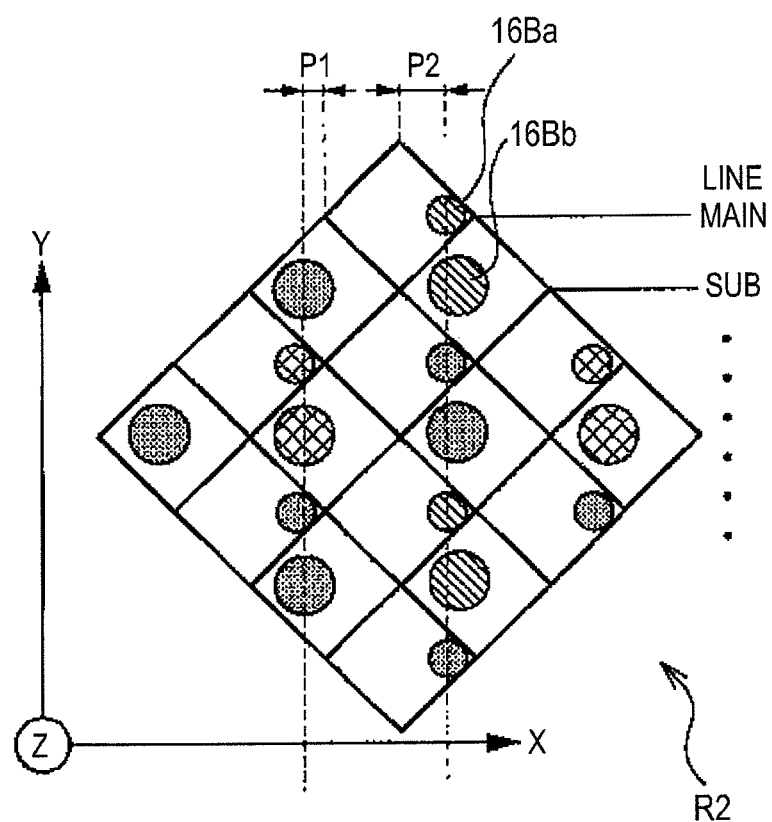
FIG. 14 is a perspective plan view illustrating a peripheral part of a CCD having another example of honeycomb alignment according to the third embodiment.

For example, as shown in FIG. 14, the sizes of the apertures 16Ba and 16Bb corresponding to the main pixels and the sub-pixels are changed in the peripheral part R2. In addition, the center positions in the left-right direction (X direction) of the apertures 16Ba of the main pixels are displaced by a predetermined first pitch P1 from the centers of the photo diodes of the pixels, respectively, and the center positions in the left-right direction (X direction) of the apertures 16Bb of the sub-pixels are displaced by a predetermined second pitch P2 from the centers of the photo diodes of the pixels, respectively.

When the pixels of the light-receiving surface are arranged in a Bayer arrangement instead of the honeycomb alignment, the size or the size and position of the apertures 16B of the pixels in the peripheral part distant in the vertical direction and/or the left-right direction from the central part of the light-receiving surface can be changed similarly.

Figure 15:
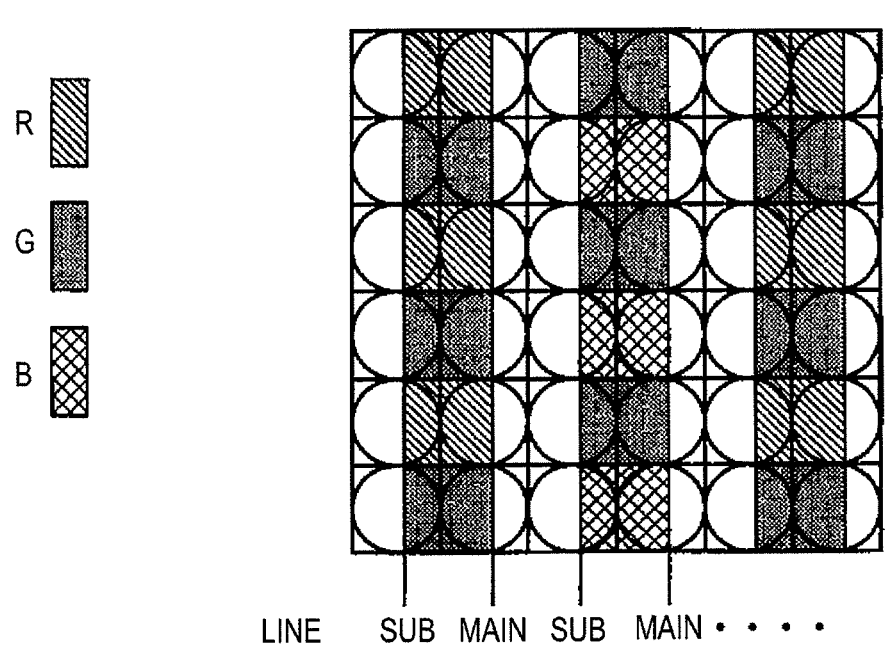
FIG. 15 is a perspective plan view illustrating one exemplarily configuration of a CCD having a Bayer arrangement according to the third embodiment.
Figure 16:
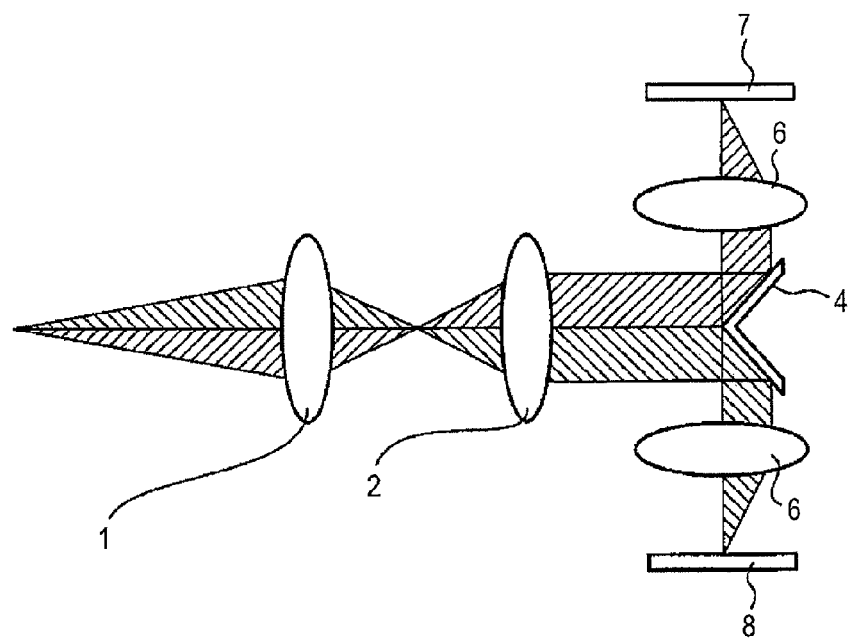
FIG. 16 is a diagram illustrating one exemplarily configuration of an imaging device according to the related art.
Figure 17:
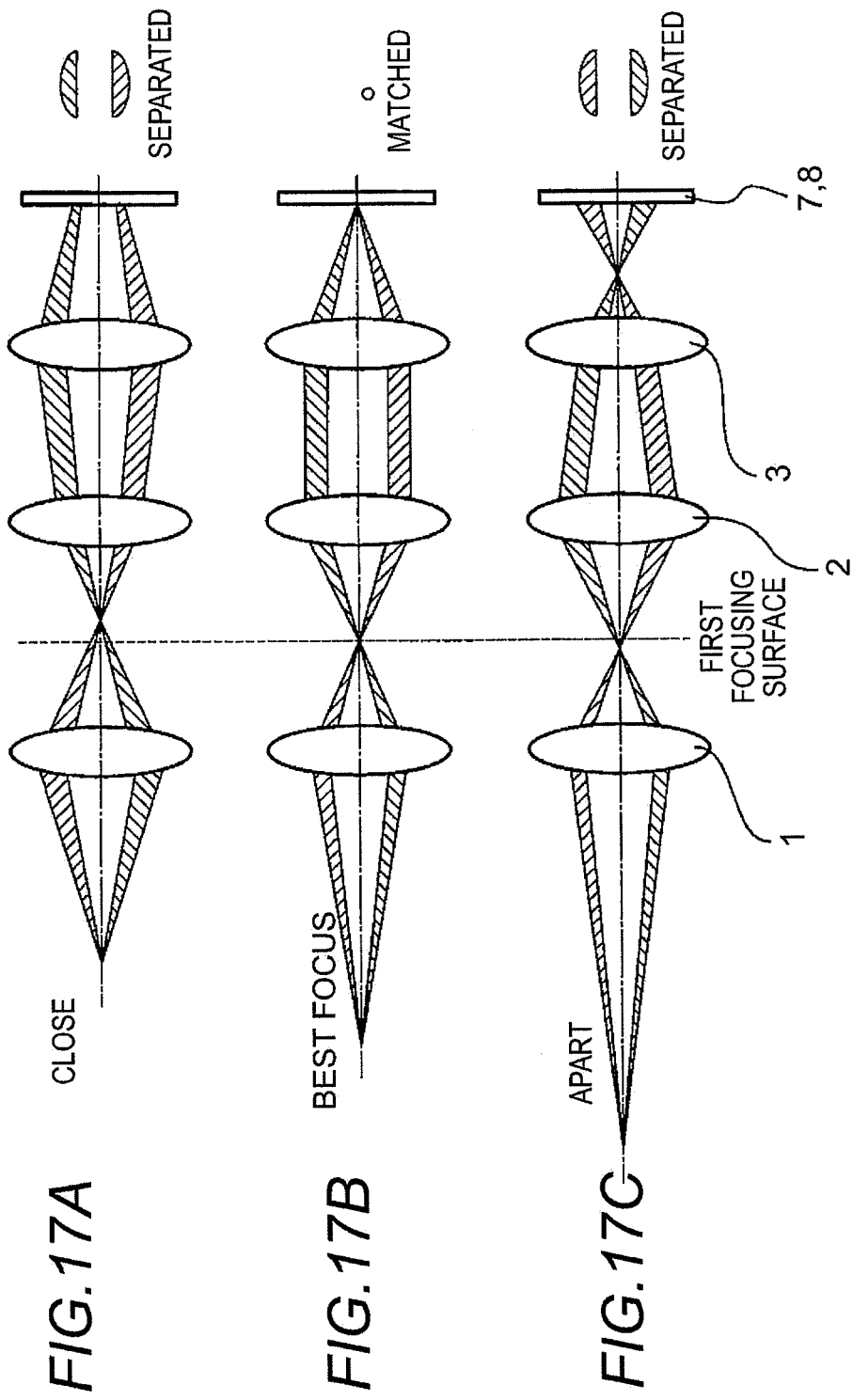
FIGS. 17A to 17C are diagrams illustrating a difference in object image formed on an image sensor due to a difference in object distance.
Figure 18:
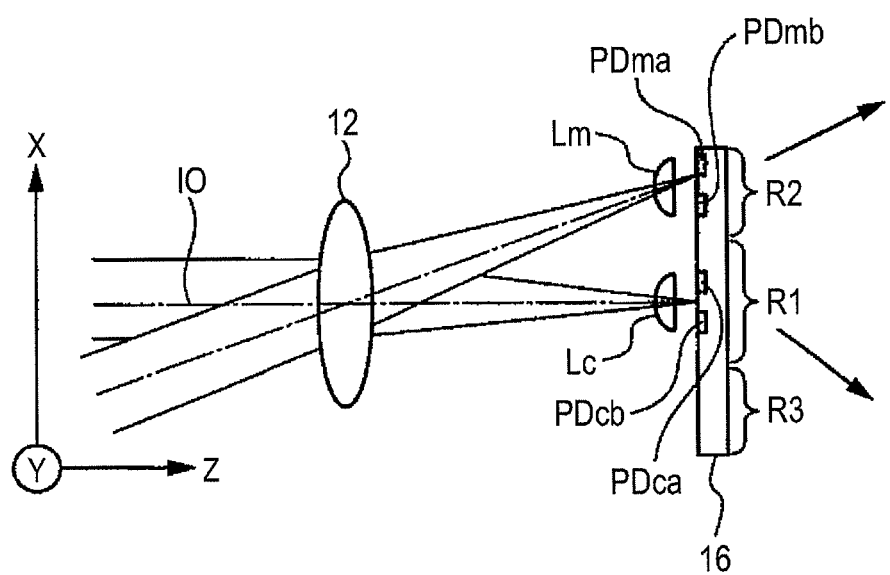
FIG. 18 is a diagram illustrating occurrence of the biased shading in a pupil splitting direction.

FIG. 15 shows an example of the Bayer arrangement. In the peripheral part R3, the size of the apertures of the main pixels is set to be great and the size of the apertures of the sub-pixels is set to be small. On the contrary, in the peripheral part R2, the size of the apertures of the main pixels is set to be small and the size of the apertures of the sub-pixels is not changed similarly to the size of the apertures in the central part or may be set to be greater. The change in size is not limited to the left side, but the same may be true of the right, up, and down sides.

In addition to the above-mentioned change in size and position of the apertures, a known electrical shading correction which is variable depending on a zoom lens position or a focus lens position may be performed. Alternatively, only an electrical shading correction may be performed in middle regions other than the central part R1 and the peripheral parts R2 and R3.

For example, when an arbitrarily set F value is greater than a predetermined F value, the shading correction part (for example, the CPU 40 or the digital signal processing part 24 shown in FIG. 1) set the amount of shading correction on dark sub-pixels to be higher than that on bright main pixels in the peripheral part R2 and sets the amount of shading correction on the dark main pixels to be higher than that on the bright sub-pixels in the peripheral part R3. For example, when an arbitrarily set zoom position goes over a predetermined zoom position and gets more distal, the shading correction part sets the amount of shading correction on the dark sub-pixels to be higher than that on the bright main pixels in the peripheral part R2 and sets the amount of shading correction on the dark main pixels to be higher than that on the bright sub-pixels in the peripheral part R3. Accordingly, it is possible to cope with a case where the shading correction cannot be surely performed only by means of the shift in size or position of the apertures 16B because the diaphragm action or the zooming action gets stronger to cause stronger unbalance in the luminous flux in the parallax direction.

The present invention is not limited to the examples described in this specification or the examples shown in the drawings, but can include various changes and improvements in design without departing from the spirit and scope of the present invention.

What is claimed is:

1. An imaging device comprising:
a single photographing optical system;
an image sensor having a plurality of phase-different pixels for obtaining a plurality of viewpoint images by photo-electrically converting a luminous flux passing through different regions of the photographing optical system;
a shading correction part for conducting a shading correction to the plurality of viewpoint images, and the shading correction part varies the amount of shading correction based on light-reduction property for one viewpoint image among the plurality of viewpoint images with respect to the amount of shading correction based on light-reduction property for another viewpoint image among the plurality of viewpoint images; and
a stereoscopic image generating part for generating a stereoscopic image from the plurality of viewpoint images,
wherein the image sensor includes a first pixel group a second pixel group corresponding to a first pupil splitting direction and a third pixel group and a fourth pixel group corresponding to a second pupil splitting direction perpendicular with respect to the first pupil splitting direction among each luminous flux passing through different regions of the photographing optical system, and
the shading correction part varies the amount of shading correction based on light-reduction property for the viewpoint image corresponding to the first pixel group with respect to the amount of shading correction based on light-reduction property for the viewpoint image corresponding to the second pixel group, and varies the amount of shading correction based on light-reduction property for the viewpoint image corresponding to the third pixel group with respect to the amount of shading correction based on light-reduction property for the viewpoint image corresponding to the fourth pixel group.

2. The imaging device according to claim 1, wherein the light-reduction property for the one viewpoint image includes a phase-difference shading generated by the difference of region of the photographing optical system passed through by the luminous flux corresponding to the one viewpoint image, and a lens shading generated by lens property of the photographing optical system, and the light-reduction property for the other viewpoint image includes a phase-difference shading generated by the difference of region of the photographing optical system passed through by the luminous flux corresponding to the other viewpoint image, and a lens shading generated by lens property of the photographing optical system.

3. The imaging device according to claim 2, wherein the phase-difference shading differs dependent on the region of the photographing optical system passed through by the luminous flux corresponding to each viewpoint image.

4. The imaging device according to claim 1, wherein the image sensor is a color image sensor having a color filter arranged to each pixel, and the shading correction part varies the amount of shading correction of the plurality of viewpoint images acquired from the color image sensor for each color corresponding to the color filter.

5. The imaging device according to claim 4, wherein the image sensor is a color image sensor having a plurality of pixels for each R (red), G (green) and B (blue) colors.

6. The imaging device according to claim 1, wherein the photographing optical system includes a zoom lens, and the shading correction part changes the amount of shading correction depending on the zoom position of the zoom lens.

7. The imaging device according to claim 1, wherein the photographing optical system includes a focus lens, and the shading correction part changes the amount of shading correction depending on the focus position of the focus lens.

8. The imaging device according to claim 1, wherein the shading correction part calculates the amount of shading correction using a function.

9. The imaging device according to claim 1, wherein the shading correction part conducts the shading correction based on a table value.

10. An imaging device comprising:
a single photographing optical system;
an image sensor having a plurality of phase-different pixels for obtaining a plurality of viewpoint images by photo-electrically converting a luminous flux passing through different regions of the photographing optical system;
a shading correction part for conducting a shading correction to the plurality of viewpoint images, and the shading correction part varies the amount of shading correction based on light-reduction property for one viewpoint image among the plurality of viewpoint images with respect to the amount of shading correction based on light-reduction property for another viewpoint image among the plurality of viewpoint images; and
a stereoscopic image generating part for generating a stereoscopic image from the plurality of viewpoint images,
wherein the image sensor includes a plurality of photo diodes arranged as the plurality of pixels on a light-receiving surface, a plurality of micro lenses arranged to correspond to the plurality of photo diodes, and a light-blocking member disposed between the plurality of photo diodes and the plurality of micro lenses, and the light-blocking member divides the plurality of photo diodes into a plurality of pixel groups corresponding to the plurality of viewpoint images by blocking a part of the luminous flux reaching from an exit pupil of the photographing optical system to the micro lenses, wherein the light-blocking member varies a light shielding amount by the light-blocking member for one pixel group among the plurality of pixel groups with respect to the light shielding amount for the other pixel group among the plurality of pixel groups based on the light-reduction property of the plurality of viewpoint images, and wherein the light shielding amount for the one pixel group is smaller at one end in the pupil splitting direction of each luminous flux passing through different regions of the photographing optical system than that of the other end, and the light shielding amount for the other pixel group is larger at the one end in the pupil splitting direction than that of the other end.

11. The imaging device according to claim 10, wherein a plurality of apertures respectively corresponding to the plurality of photo diodes are formed in the light-blocking member, and the plurality of apertures are arranged to lateralize from the optical axes of the micro lenses.

12. The imaging device according to claim 10, wherein the light-blocking member varies the light shielding amount by the light-blocking member for one pixel group among the plurality of pixel groups with respect to the light shielding amount for the other pixel group among the plurality of pixel groups based on the light-reduction property of the plurality of viewpoint images.

13. The imaging device according to claim 10, wherein the image sensor is a color image sensor having a color filter arranged to each pixel, and the light blocking member varies the light shielding amount for each color of the color filter.

* * * * *